United States Patent
Tsuchiya et al.

(10) Patent No.: US 8,031,932 B2
(45) Date of Patent: Oct. 4, 2011

(54) PATTERN INSPECTION APPARATUS AND METHOD

(75) Inventors: Hideo Tsuchiya, Tokyo (JP); Takayuki Abe, Kanagawa (JP)

(73) Assignee: NuFlare Technology, Inc., Numazu-shi (JP)

( * ) Notice: Subject to any disclaimer, the term of this patent is extended or adjusted under 35 U.S.C. 154(b) by 525 days.

(21) Appl. No.: 12/274,034

(22) Filed: Nov. 19, 2008

(65) Prior Publication Data

US 2009/0129664 A1    May 21, 2009

(30) Foreign Application Priority Data

Nov. 21, 2007    (JP) .................................. 2007-301296

(51) Int. Cl.
G06K 9/00    (2006.01)
G06K 9/46    (2006.01)
G06K 9/66    (2006.01)

(52) U.S. Cl. .................... 382/148; 382/145; 382/194
(58) Field of Classification Search ........... 356/141–152
See application file for complete search history.

(56) References Cited

U.S. PATENT DOCUMENTS

| | | | |
|---|---|---|---|
| 4,740,708 A | | 4/1988 | Batchelder |
| 4,805,123 A | * | 2/1989 | Specht et al. ................. 382/144 |
| 5,754,678 A | * | 5/1998 | Hawthorne et al. ........... 382/149 |
| 6,285,783 B1 | | 9/2001 | Isomura et al. |
| 7,176,433 B1 | | 2/2007 | Rosengaus |
| 7,263,216 B2 | * | 8/2007 | Shishido et al. .............. 382/149 |
| 7,359,043 B2 | | 4/2008 | Tsuchiya et al. |
| 7,474,395 B2 | * | 1/2009 | Nelson et al. ................. 356/300 |

FOREIGN PATENT DOCUMENTS

JP    10-104168    4/1998
JP    2004-212221    7/2004

OTHER PUBLICATIONS

U.S. Appl. No. 12/212,958, filed Sep. 18, 2008, Takayuki Abe et al.

* cited by examiner

Primary Examiner — Gregory J Toatley
Assistant Examiner — Jarreas C Underwood
(74) Attorney, Agent, or Firm — Oblon, Spivak, McClelland, Maier & Neustadt, L.L.P.

(57) ABSTRACT

A pattern inspection apparatus includes a stage configured to mount thereon a target workpiece to be inspected where patterns are formed, at least one sensor configured to move relatively to the stage and capture optical images of the target workpiece to be inspected, a first comparing unit configured to compare first pixel data of an optical image captured by one of the at least one sensor with first reference data at a position corresponding to a position of the first pixel data, and a second comparing unit configured to compare second pixel data of an optical image captured by one of the at least one sensor at a position shifted by a sub-pixel unit from the position where the optical image of the first pixel data is captured, with second reference data at a position corresponding to the position of the second pixel data.

12 Claims, 19 Drawing Sheets

Related Art
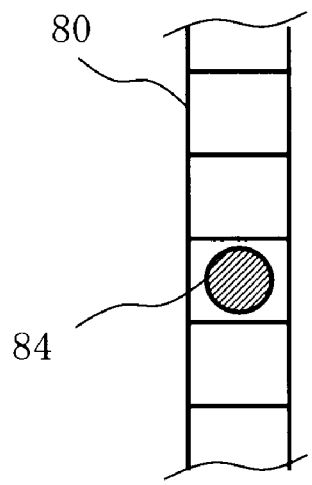
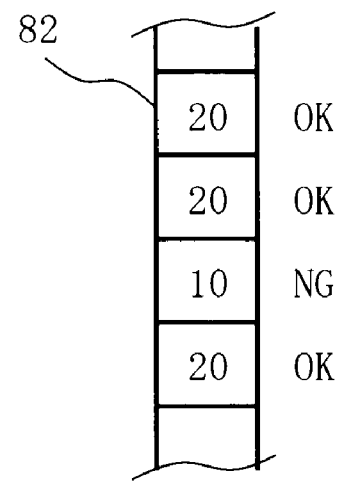
FIG. 23A  FIG. 23B
Related Art
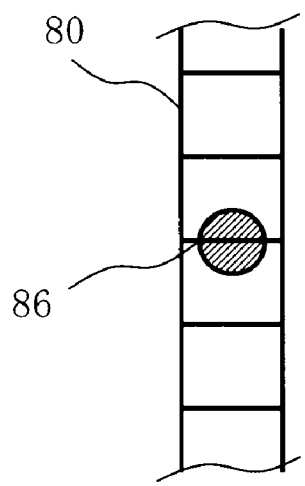
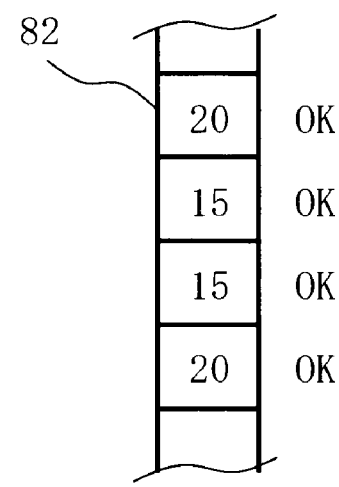
FIG. 24A  FIG. 24B

PATTERN INSPECTION APPARATUS AND METHOD

CROSS-REFERENCE TO RELATED APPLICATION

This application is based upon and claims the benefit of priority from the prior Japanese Patent Application No. 2007-301296 filed on Nov. 21, 2007 in Japan, the entire contents of which are incorporated herein by reference.

BACKGROUND OF THE INVENTION

1. Field of the Invention

The present invention relates to a pattern inspection apparatus and a pattern inspection method. For example, it relates to an inspection apparatus and method for inspecting patterns by using a line sensor.

2. Description of Related Art

In recent years, with an increase in high integration and large capacity of large-scale integrated (LSI) circuits, a circuit line width required for semiconductor elements is becoming narrower and narrower. These semiconductor elements are manufactured by exposing and transferring a pattern onto a wafer to form a circuit by means of a reduced projection exposure apparatus, known as a stepper, while using a master or "original" pattern (also called a mask or a reticle, and hereinafter generically referred to as a mask) with a circuit pattern formed thereon. Therefore, in order to manufacture a mask for transfer printing a fine circuit pattern onto a wafer, an electron beam pattern writing apparatus capable of writing or "drawing" fine circuit patterns needs to be employed. The pattern circuits maybe directly written onto a wafer by the pattern writing apparatus. In addition to the writing apparatus using electron beams, a laser beam writing apparatus which uses laser beams to write patterns is also under development.

Since a lot of manufacturing cost is needed for the production of LSI, an improvement in yield is a crucial issue. However, as typified by a DRAM (Dynamic Random Access Memory) of 1 giga-bit class, the order of a pattern constituting the LSI has been changing from submicron to nano-meter. Then, one of major factors that decrease the yield is a pattern defect of a mask used in exposing and transferring an ultrafine pattern onto a semiconductor wafer by a photolithography technique. In recent years, with miniaturization of an LSI pattern formed on a semiconductor wafer, dimensions to be detected as a pattern defect have become extremely small. Thus, a pattern inspection apparatus for inspecting defects of a transfer mask used in manufacturing the LSI needs to be highly accurate.

Incidentally, with development of multimedia technologies, the size of a liquid crystal substrate of an LCD (Liquid Crystal Display) is becoming larger, e.g., 500 mm×600 mm or more, and a pattern of a TFT (Thin Film Transistor) or the like formed on the liquid crystal substrate is becoming finer. Therefore, it is increasingly required to inspect an ultra-fine pattern defect in a large range. For this reason, it is urgently required to develop a pattern inspection apparatus which efficiently inspects defects of a pattern of a large-area LCD and a photomask used in manufacturing the large-area LCD in a short time.

As an inspection method, there is known the method of comparing an optical image obtained by capturing a pattern formed on a target workpiece or "sample" such as a lithography mask at a predetermined magnification by use of a magnification optical system with design data, or comparing it with an optical image of an identical pattern on the target workpiece. For example, the following is known as pattern inspection methods: "die to die inspection" that compares optical image data obtained by capturing images of identical patterns at different positions on the same mask, and "die to database inspection" having the steps of inputting into an inspection apparatus the writing data (design pattern data) generated by converting pattern CAD data into an appropriate format for input to a writing apparatus when writing a pattern on a mask, generating design image data (reference image) based on the input writing data, and comparing the design image data with an optical image serving as measurement data obtained by capturing the image of the pattern. When inspecting using the inspection apparatus, the target workpiece is placed on a stage to be scanned by a flux of light while the stage is moving to perform inspection. The target workpiece is irradiated with a flux of light from a light source and an illumination optical system. Light transmitted through the target workpiece or reflected therefrom is focused on a sensor through the optical system. The image captured by the sensor is transmitted to a comparison circuit as measurement data. In the comparison circuit, after position alignment of the images, the measurement data and the reference data are compared based on an appropriate algorithm. If there is no matching between them, it is judged that a pattern defect exists.

FIGS. 23A and 23B show an example of a method for judging defects. FIG. 23A shows where a defect 84 exists in one of a plurality of light receiving elements 80. In this case, it is supposed the pixel value (gray level value) of the transmitting part is adjusted to be "20" and that of the shading part to be "0", for example. Then, a pixel 82 with no defect 84 being a shading part has a gray level value "20", whereas the pixel 82 with imaged defect 84 has a gray level value "10" as shown in FIG. 23B. Although not shown, gray level values of all the pixels in the reference data are respectively "20" because there is no defect 84. If the defect judgment threshold value for judging a defect is defined to be 7, for example, when a difference between the gray level value of a pixel and that of the reference data is 7 or more, it is judged that there is a defect. In the case of FIGS. 23A and 23B, since the pixel 82 having imaged the defect 84 has a gray level value of "10", it is judged that there is a defect because of being different from the gray level value of the reference data by 7 or more gray levels.

If a defect exists at a position straddling the boundary of a pixel region which is captured by a sensor, inspection sensitivity falls because a part of information of the defect is missing.

FIGS. 24A and 24B show an example of the situation of a defect position straddling the boundary of a pixel region. For example, when the center of a defect 86 straddles the boundary of a pixel region as shown in FIG. 24A, the two straddled light receiving elements 80 respectively capture half of the defect 86. In that case, the pixel 82 without the defect 86 has a gray level value of 20, whereas the pixel 82 having captured half of the defect 86 has a gray level value of 15 as shown in FIG. 24B. As mentioned above, if the defect judgment threshold value is defined to be 7, since the pixel 82 having imaged half of the defect 86 has a gray level value of 15, it differs from the gray level value of the reference data by only 5 gray levels. Thus, it is not judged that there is a defect, thereby making an incorrect judgment.

Now, although not related to the case of a defect straddling the boundary of a pixel region to be captured by a sensor, in the die-to-die inspection method using the inspection apparatus, a technique is disclosed that makes the relation between a pixel of chip A and a pattern be the same as the relation between a pixel of chip A' to be compared and the pattern (refer to Japanese Patent Application Laid-open (JP-A) No. 2004-212221). Moreover, another technique is disclosed that performs mesh dividing into grids each being smaller than the size of a pixel when generating reference data from design data in the inspection apparatus (refer to Japanese Patent Application Laid-open (JP-A) No. 10-104168).

As mentioned above, if a defect exists at the position straddling the boundary of a pixel region of the sensor, since detect information is distributed into two straddled pixel regions, the inspection sensitivity is decreased, thereby resulting in a problem of overlooking defects.

BRIEF SUMMARY OF THE INVENTION

It is an object of the present invention to provide an inspection apparatus and method capable of detecting a defect even when the defect straddles the boundary of a pixel region of the sensor.

In accordance with one aspect of the present invention, a pattern inspection apparatus includes a stage configured to mount thereon a target workpiece to be inspected where patterns are formed, at least one sensor configured to move relatively to the stage and capture optical images of the target workpiece to be inspected, a first comparing unit configured to compare first pixel data of an optical image captured by one of the at least one sensor with first reference data at a position corresponding to a position of the first pixel data, and a second comparing unit configured to compare second pixel data of an optical image captured by one of the at least one sensor at a position shifted by a sub-pixel unit from the position where the optical image of the first pixel data is captured, with second reference data at a position corresponding to the position of the second pixel data.

In accordance with another aspect of the present invention, a pattern inspection method includes capturing overlappingly optical images of a target workpiece to be inspected at positions shifted each other by a sub-pixel unit, comparing first pixel data of an optical image which has been captured with first reference data at a position corresponding to a position of the first pixel data, comparing second pixel data of an optical image captured at a position shifted by a sub-pixel unit from the position where the optical image of the first pixel data is captured, with second reference data at a position corresponding to the position of the second pixel data, and outputting comparison results.

Moreover, in accordance with another aspect of the present invention, a pattern inspection method includes capturing overlappingly optical images of a target workpiece to be inspected at positions shifted each other by a sub-pixel unit, comparing first pixel data of an optical image which has been captured with first reference data at a position corresponding to a position of the first pixel data, comparing second pixel data of an optical image captured at a position shifted by a sub-pixel unit from the position where the optical image of the first pixel data is captured, with second reference data at a position corresponding to the position of the second pixel data, and merging comparison results and outputting a merged result.

BRIEF DESCRIPTION OF THE DRAWINGS

FIG. 23A and FIG. 23B show an example of a method of judging a defect; and

FIG. 24A and FIG. 24B show an example of a state of judging a defect when a defect position straddles the boundary of a pixel region.

DETAILED DESCRIPTION OF THE INVENTION

Embodiment 1

Figure 1:
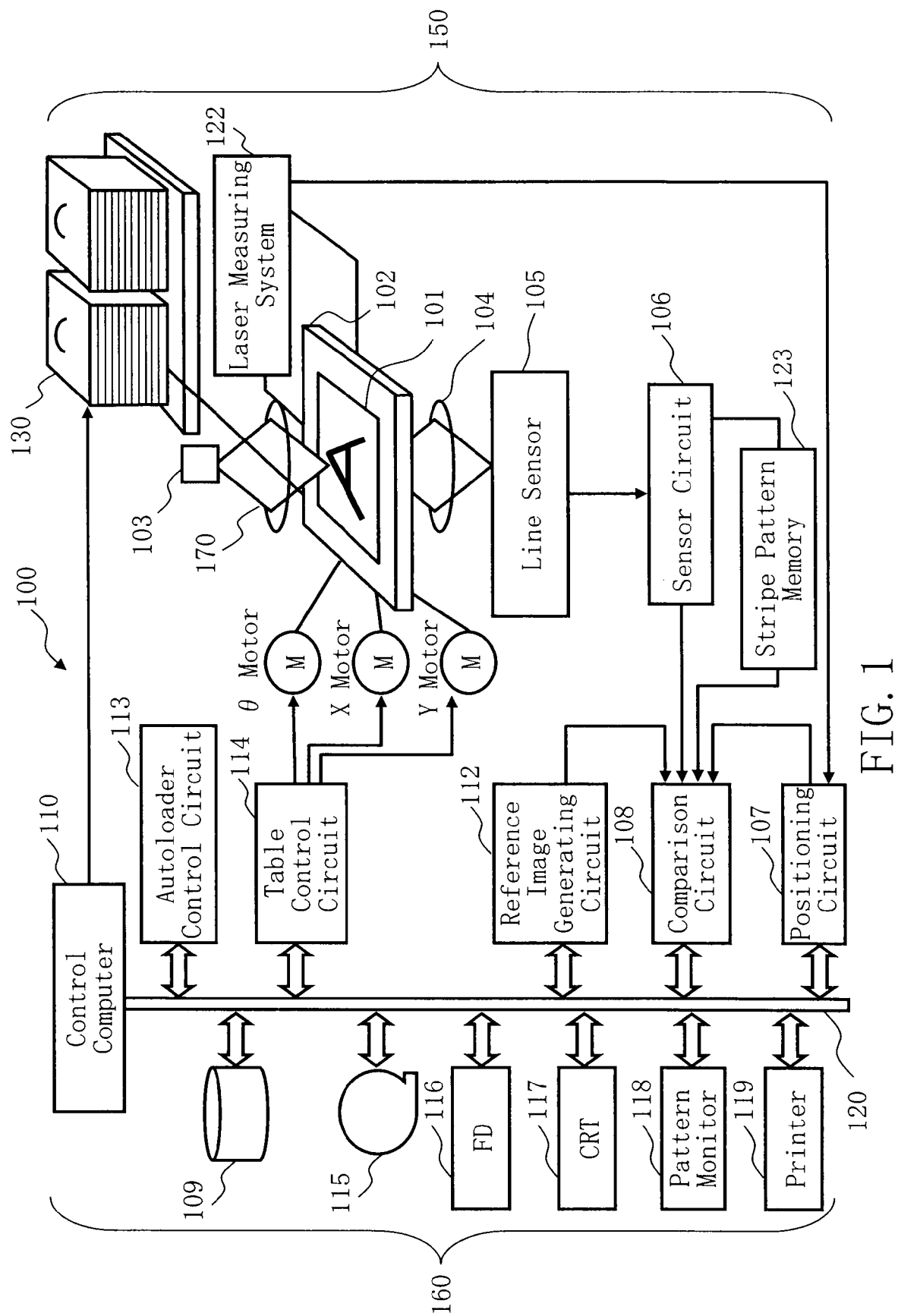
FIG. 1 is a schematic diagram showing a structure of a pattern inspection apparatus according to Embodiment 1.

FIG. 1 is a schematic diagram showing a structure of a pattern inspection apparatus according to Embodiment 1. In FIG. 1, an inspection apparatus 100 for inspecting defects of a target workpiece, such as a mask, includes an optical image acquisition unit 150 and a control system circuit 160. The optical image acquisition unit 150 includes a light source 103, an XYθ table 102, an illumination optical system 170, a magnifying optical system 104, a line sensor 105, a sensor circuit 106, a laser length measuring system 122, and an autoloader 130.

In the control system circuit 160, a control computer 110 serving as a computer is connected, through a bus 120, to a positioning circuit 107, a comparison circuit 108, a reference image generating circuit 112, an autoloader control circuit 113, a table control circuit 114, a magnetic disk drive 109, a magnetic tape drive 115, a flexible disk drive (FD) 116, a cathode ray tube (CRT) 117, a pattern monitor 118, and a printer 119. Moreover, the sensor circuit 106 is connected to a stripe pattern memory 123 connected to the comparison circuit 108. The XYθ table 102, which is an example of the stage, is driven by an X-axis motor, a Y-axis motor, and a θ-axis motor. FIG. 1 depicts structure elements necessary for describing Embodiment 1, and it should be understood that other structure elements generally necessary for the inspection apparatus 100 may be included therein.

In the inspection apparatus 100, an inspection optical system of large magnification is composed of the light source 103, the XYθ table 102, the illumination optical system 170, the magnifying optical system 104, the line sensor 105, and the sensor circuit 106. The XYθ table 102 is driven by the table control circuit 114 under the control of the control computer 110. The XYθ table 102 can be moved by a drive system such as a three-axis (X-Y-θ) motor, which drives the XYθ table 102 in the X direction, the Y direction, and the θ direction. For example, a step motor can be used as each of these X, Y, and θ motors. The moving position of the XYθ table 102 is measured by the laser length measurement system 122 and supplied to the positioning circuit 107. A photomask 101 on the XYθ table 102 is automatically conveyed from the autoloader 130 driven by the autoloader control circuit 113, and automatically ejected after the inspection.

The photomask 101 which serves as an inspection sample being a target workpiece to be tested is placed on the XYθ table 102, serving as an example of a stage, movable in a horizontal direction and a rotating direction by the X-, Y-, and θ-axis motors. The photomask 101 has a pattern formed thereon. Then, the pattern written on the photomask 101 is irradiated by continuous light emitted from a suitable light source 103, thorough the illumination optical system 170. The light penetrated the photomask 101 is focused, through the magnifying optical system 104, on the line sensor 105 as an optical image and enters in it.

Figure 2:
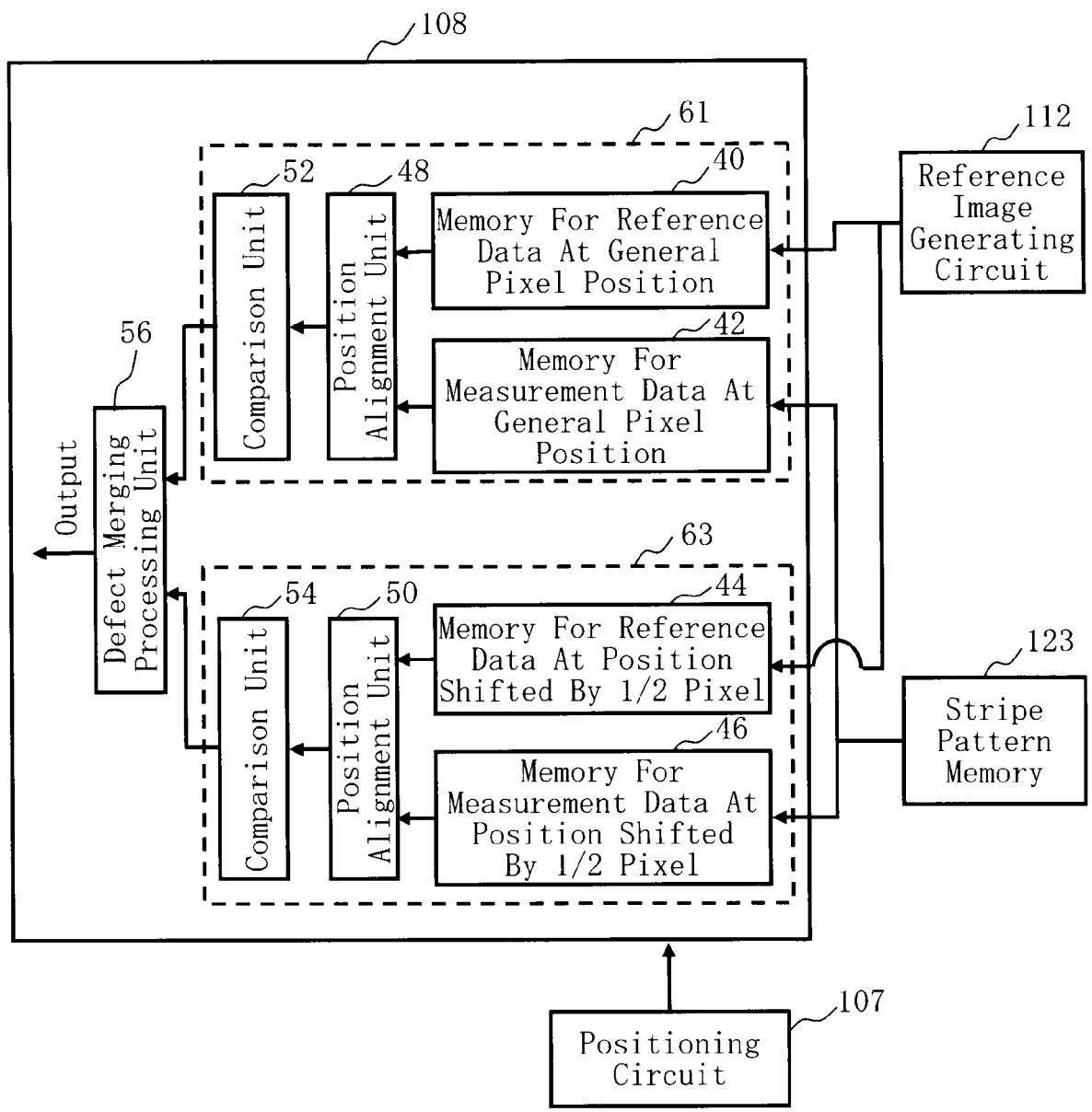
FIG. 2 is a schematic diagram showing an internal structure of a comparison circuit according to Embodiment 1.

FIG. 2 is a schematic diagram showing the internal structure of the comparison circuit according to Embodiment 1. In the comparison circuit 108 of FIG. 2, there are arranged an inspection system 61 which compares measurement data at a general pixel unit position with reference data, and an inspection system 63 which compares measurement data at a position shifted from the general pixel unit position by a sub-pixel unit with reference data. In the inspection system 61, there are arranged a reference data memory 40, a measurement data memory 42, a position alignment unit 48, and a comparing unit 52. In the inspection system 63, there are arranged a reference data memory 44, a measurement data memory 46, a position alignment unit 50, and a comparing unit 54. Further, in the comparison circuit 108, there is arranged a defect merging processing unit 56 which merges outputs from the comparing units 52 and 54.

Figure 3:
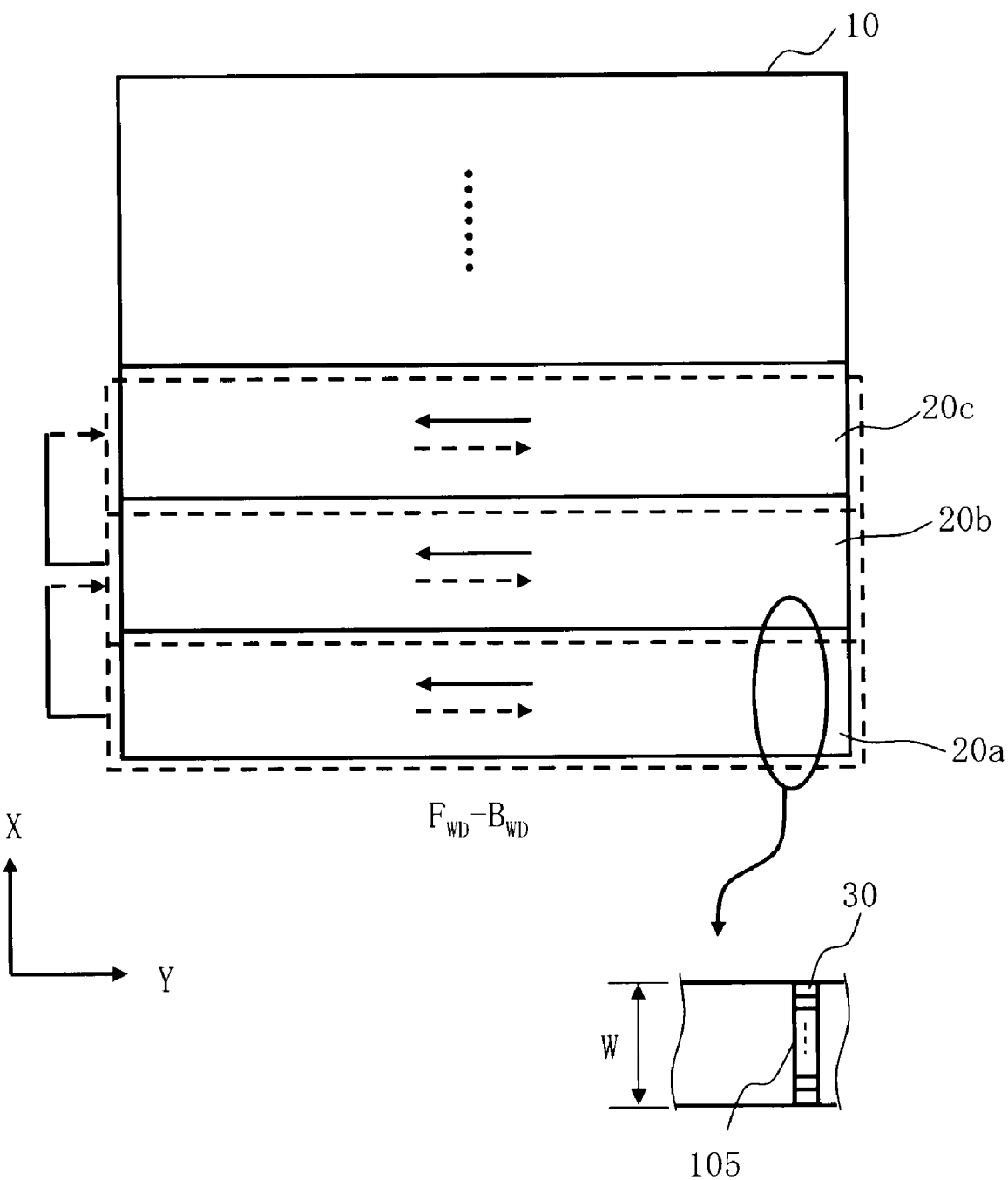
FIG. 3 is a schematic diagram for explaining a procedure for acquiring an optical image according to Embodiment 1.

FIG. 3 is a schematic diagram for explaining a procedure for acquiring an optical image according to Embodiment 1. An inspection region 10 is virtually divided into a plurality of strip-like inspection stripes 20 each having a scanning width W, for example, in the X direction as indicated by the arrow as shown in FIG. 3. The operation of the XYθ table 102 is controlled so that the line sensor 105 may scan each divided inspection stripe 20. While the XYθ table 102 moves, optical images are acquired by the line sensor 105 which continuously moves relatively in the Y direction (first direction) as indicated by the arrow shown in FIG. 3. That is, the line sensor 105 continuously captures optical images each having a scanning width W as shown in FIG. 3. According to Embodiment 1, after capturing an optical image in one inspection stripe 20, the line sensor 105 similarly captures another optical image having the scanning width W continuously at a position shifted in the X direction by a sub-pixel, such as ½ pixel, while moving in a direction reverse to the last image capturing direction. That is, the image capturing is repeated in the forward (FWD) and backward (BWD) direction, meaning going in a reverse direction when advancing and returning. Then, it should be understood that the line sensor moves relatively to the movement of the XYθ table 102. Specifically, after capturing an image in a first inspection stripe 20a in the Y direction as an inspection direction, at a position shifted in the −X direction by ½ pixel of the first inspection stripe 20a, the line sensor 105 moves relatively in the X direction by ½ pixel, and then, captures an image in the first inspection stripe 20a in the −Y direction as an inspection direction. Next, after moving relatively in the X direction by the length subtracting ½ pixel from the scanning width W, the line sensor 105 captures an image in an inspection stripe 20b in the Y direction as an inspection direction. Then, after moving relatively in the X direction by ½ pixel, the line sensor 105 captures an image in the inspection stripe 20b in the −Y direction as an inspection direction. Next, after moving relatively in the X direction by the length subtracting ½ pixel from the scanning width W, the line sensor 105 captures an image in an inspection stripe 20c in the Y direction as an inspection direction. Then, after moving relatively in the X direction by ½ pixel, the line sensor 105 captures an image in the inspection stripe 20c in the −Y direction as an inspection direction. Thus, images are acquired so that the optical images of the same region may be overlappedly captured by the line sensor 105 at the positions shifted by a sub-pixel. For example, if the line sensor 105 in which a plurality of light receiving elements 30 (photo-diodes) for 2048 pixels are arrayed in the X direction (second direction) orthogonal to the inspection direction (Y direction) is used, the scanning width W becomes 2048 pixels. Optical images in the same inspection stripe are captured while shifting these light receiving elements 30 by a sub-pixel unit.

In Embodiment 1, there is described a case where the image of pixel data (first pixel data) captured when advancing and the image of pixel data (second pixel data) captured when returning are captured by using one line sensor 105. The line sensor 105 includes a plurality of light receiving elements 30 arrayed in the X direction (second direction) orthogonal to the Y direction (first direction) to which the one line sensor 105 moves relatively to the XYθ table 102 (stage). After the image of the pixel data (first pixel data) has been captured while advancing, the line sensor 105 is shifted relatively in the X direction by a sub-pixel unit, and then, the image of the pixel data (second pixel data) is captured while returning.

Figure 4:
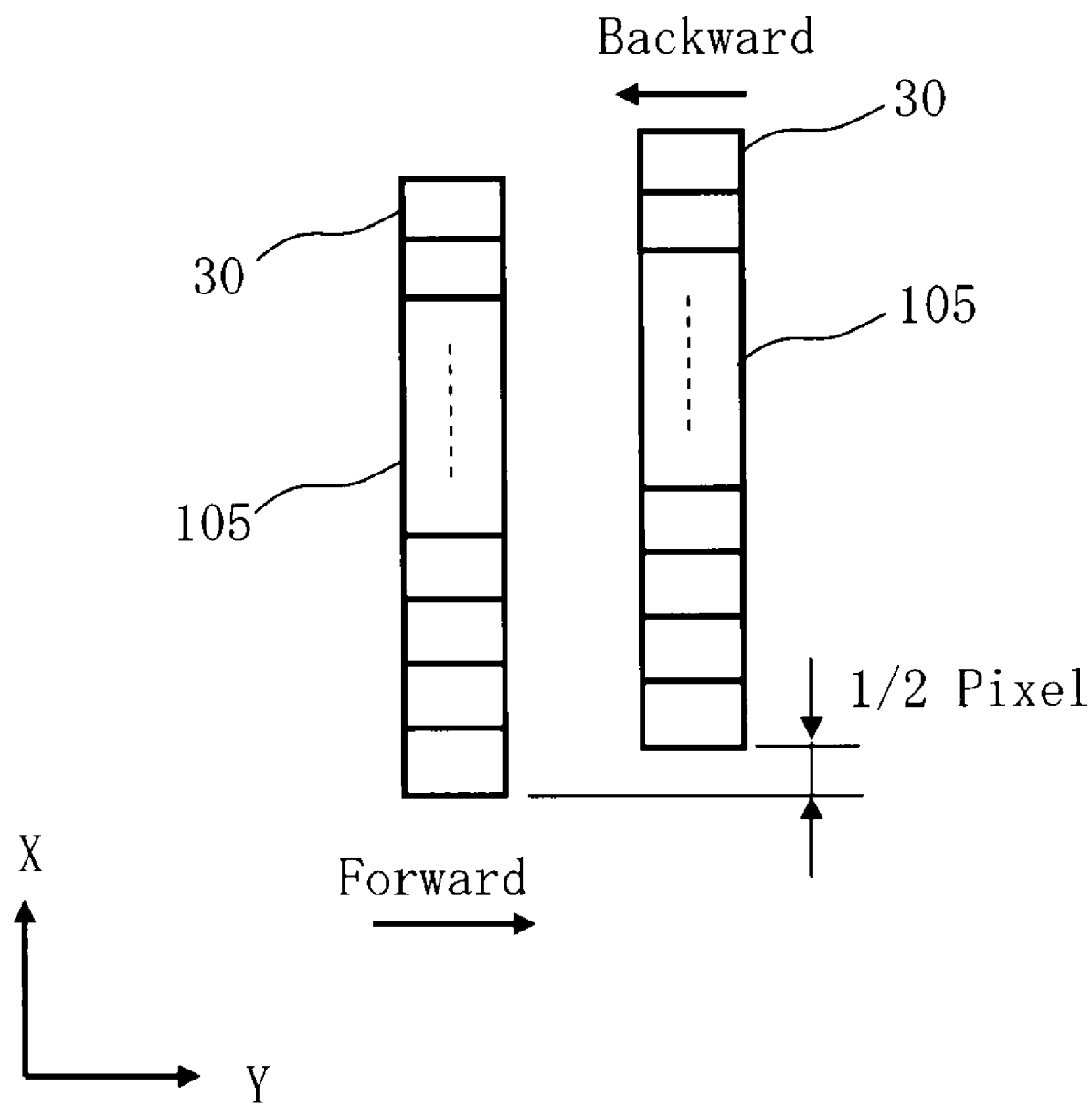
FIG. 4 is a schematic diagram showing an example of how to shift the line sensor according to Embodiment 1.

FIG. 4 is a schematic diagram showing an example of how to shift the line sensor according to Embodiment 1. In FIG. 4, when the line sensor 105 in which a plurality of light receiving elements 30 for 2048 pixels are arrayed in the X direction is used, image capturing is performed at the positions shifted each other by ½ pixel (0.5 pixel) in the X direction when advancing and returning. Thus, it is preferable for each pixel data to be imaged overlappedly at the positions shifted each other by ½ pixel. However, it is not limited to ½, and as will be described, it may be shifted by ⅓ or ¼ pixel.

Figure 5:
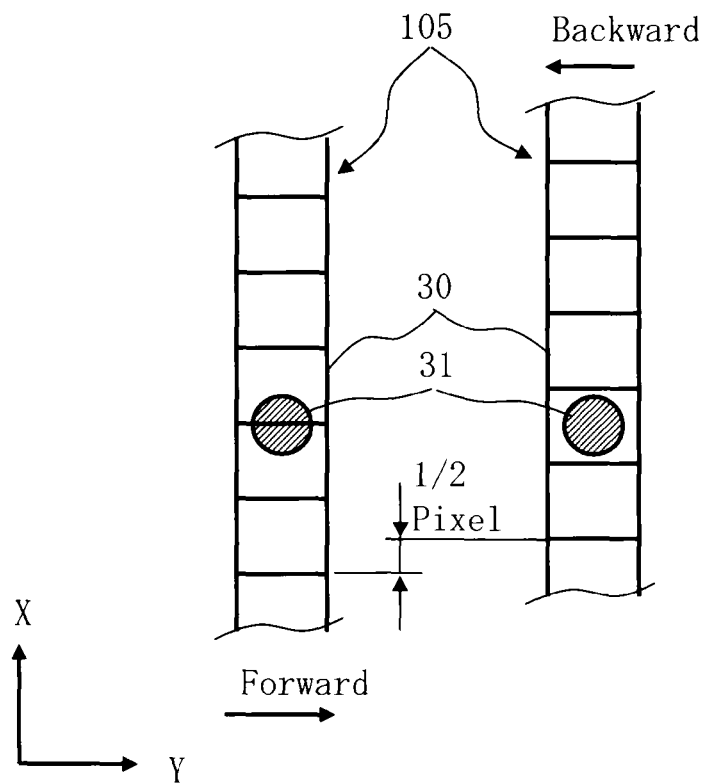
FIG. 5 shows an example of the case of a defect position straddling the boundary of a pixel region of a sensor according to Embodiment 1.

FIG. 5 shows an example of the case of a defect position straddling the boundary of a pixel region of a sensor according to Embodiment 1. In FIG. 5, for example, even when the center of a defect 31 straddles the boundary of the light receiving element 30 of the line sensor 105 when advancing, since the line sensor 105 captures an image at the position shifted by ½ pixel in the X direction when returning, the entire defect 31 can be included in one of the light receiving elements 30.

Figure 6:
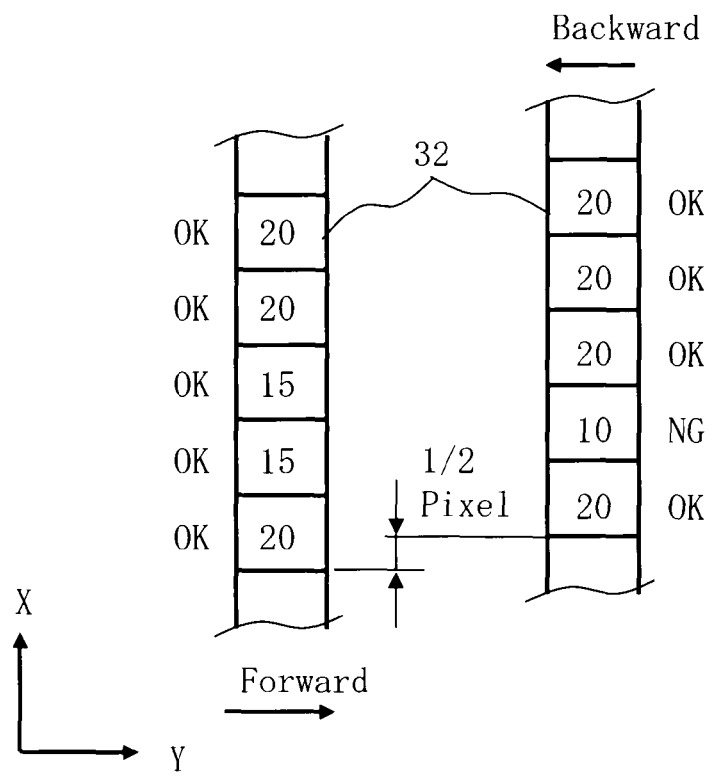
FIG. 6 shows an example of a gray level value of each pixel imaged in the state of FIG. 5.

FIG. 6 shows an example of a gray level value of each pixel imaged in the state of FIG. 5. In this case, it is supposed the pixel value (gray level value) of the transmitting part is adjusted to be 20 and that of the shading part to be 0, for example. Then, when advancing, for example, a pixel 32 with no defect 31 being a shading part has a gray level value of 20, whereas the pixel 32 having imaged half of the defect 31 has a gray level value of 15. Although not shown, gray level values of all the pixels in the reference data are respectively 20 because there is no defect 31. If the defect judgment threshold value for judging a defect is defined to be 7, for example, when a difference between the gray level value of a pixel and that of the reference data is 7 or more, it is judged that there is a defect. In the case of the pixel 32 having imaged half of the defect 31, it has a gray level value of 15, which differs from the gray level value of the reference data by only 5 gray levels. Thus, it is not judged that there is a defect, thereby making an incorrect judgment. On the other hand, when returning, the pixel 32 without the defect 31 has a gray level value of 20, whereas the pixel 32 having imaged the entire defect 31 has a gray level value of 10. Since the gray level difference is 10, it is judged that there is a defect because of being different from the gray level value of the reference data by 7 or more gray levels.

The pattern image focused on the line sensor 105 is photo electrically converted by each light receiving element 30 of the line sensor 105, and further analog-to-digital (A/D) converted by the sensor circuit 106. Each pixel data of measurement data of each inspection stripe 20 is stored in the stripe pattern memory 123. Then, the each pixel data of measurement data is sent to the comparison circuit 108 with data indicating the position of the photo mask 101 on the XYθ table 102 output from the positioning circuit 107. The each pixel data of measurement data is 8-bit unsigned data, for example, and indicates a gray level (light quantity) of brightness of each pixel. In the example mentioned above, the gray level is expressed by a value of 0 to 20. However, it should be understood that the range of the gray level value is not limited to 0 to 20, and other range, such as 0 to 255, may also be acceptable.

In the reference image generating circuit 112, reference image data at the position corresponding to the measurement data is generated. Concretely, reference image data at a general pixel unit position and reference image data at a position shifted from the general pixel unit position by a sub-pixel unit are generated. In the reference image generating circuit 112, image data (reference image data) corresponding to measurement data is generated as follows: Information (data) on the design pattern used in forming a pattern of the photo mask 101 is stored in the magnetic disk drive 109 being an example of a storage device (storage unit). Then, the information (data) on the design pattern is read from the magnetic disk drive 109 through the control computer 110, and the read design pattern used as design figure data of the photo mask 101 is converted into image data (design image data) of multiple values. Then, suitable filtering process is applied to the design image data being image data. The measurement data being an optical image obtained from the sensor circuit 106 is in a state affected by the filtering due to the resolution characteristics of the magnifying optical system 104 and/or the aperture effect of the light receiving element of the line sensor 105, etc., in other words, in an analog state continuously varying. Therefore, by applying the filtering process also to the design image data, i.e., image data of the design side having the image intensity (gray value) of digital values, it becomes possible to match the design image data with the measurement data. In this way, reference image data is created to be compared with measurement data being optical image data. Each pixel data of the created reference image data is, for example, 8-bit unsigned data like each pixel data of the measurement data, and is expressed by a gray level of brightness of each pixel. In the example mentioned above, the gray level is expressed by a value of 0 to 20. However, as has been stated, it should be understood that the range of the gray level value is not limited to 0 to 20, and other range, such as 0 to 255, may also be acceptable. Then, each pixel data (reference data) of the reference image data is sent to the comparison circuit 108.

Figure 7:
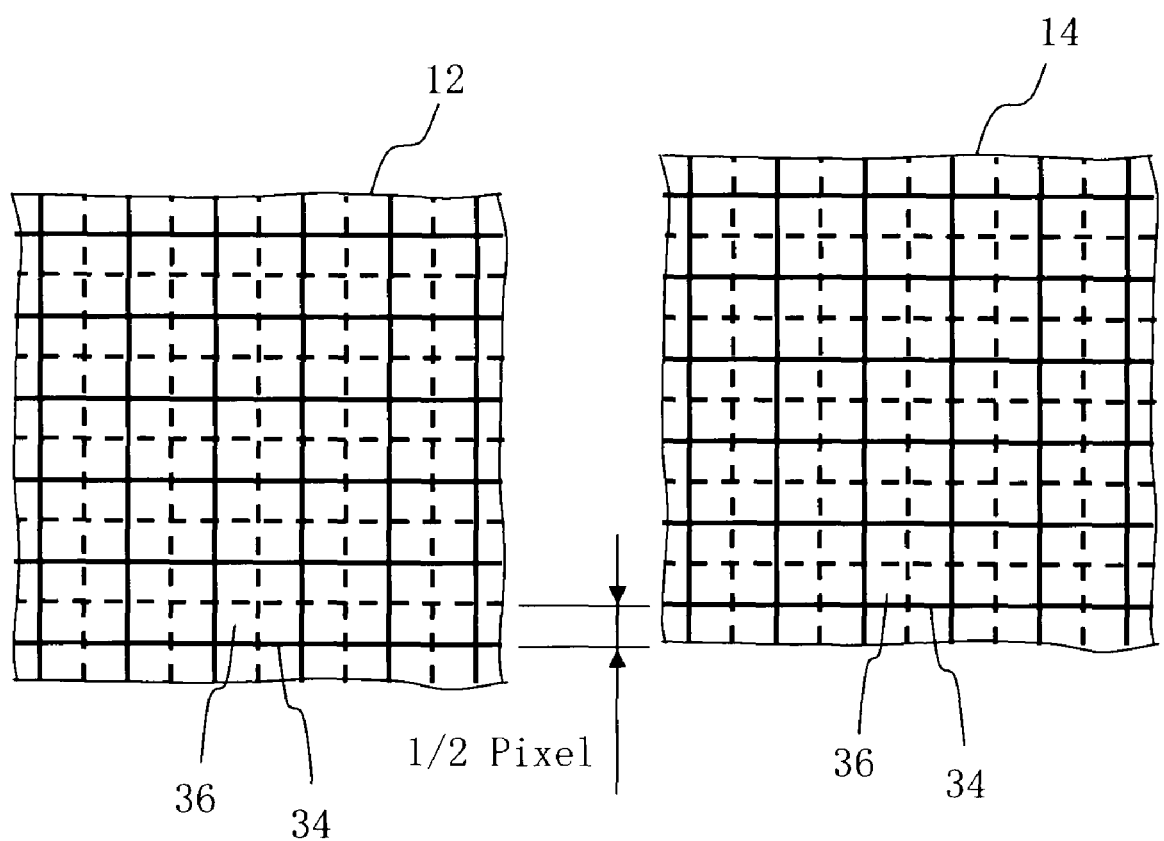
FIG. 7 shows an example of how to virtually divide reference image data into meshes according to Embodiment 1.

FIG. 7 shows an example of how to virtually divide the reference image data into meshes according to Embodiment 1. In FIG. 7, a region 34 based on a pixel unit is shown in solid line, and a region 36 based on a ½ pixel unit is shown in dotted line. Thus, by virtually dividing the region by using a grid size of half the mesh which is based on a pixel unit, the mesh region can be doubled, namely it becomes a double mesh region. Reference image data 12 is created at the position matching to the measurement data imaged based on a general pixel unit. On the other hand, reference image data 14 is created at the position matching to the measurement data imaged at the position shifted from the general pixel unit position by ½ pixel. Thus, by making the mesh size be doubled mesh, even an image at a position shifted by ½ pixel can also be easily created. Although the case of ½ pixel as a sub-pixel has been described, it is not limited to it. It is enough to divide the region into meshes to be corresponding to an amount of shifting used at the time of acquiring measurement data, such as ⅓ pixel or ¼ pixel. While the sub-pixel size is applied to both the directions of X and Y in FIG. 7, it is also acceptable to use the sub-pixel size only in the Y direction, for example. What is necessary is to perform division by using a sub-pixel size in the same direction as shifting the measurement data to be image captured.

In the comparison circuit 108, measurement data image-captured at the general pixel unit position is stored into the measurement data memory 42 from the stripe pattern memory 123. Moreover, measurement data image-captured at a position shifted from the general pixel unit position by a sub-pixel is stored into the measurement data memory 46 from the stripe pattern memory 123. In the meantime, reference image data to be compared with the measurement data image-captured at the general pixel unit position is stored into the reference data memory 40 from the reference image generating circuit 112. Moreover, reference image data to be compared with the measurement data image-captured at the position shifted from the general pixel unit position by a sub-pixel is stored into the reference data memory 44 from the reference image generating circuit 112.

In the inspection system 61, the position alignment unit 48 reads the measurement data from the measurement data memory 42 and the reference image data from the reference data memory 40. Then, position alignment is performed between the measurement data and the reference image data in each region of the size of 512×512 pixels, for example. Then, the comparing unit 52 compares each pixel data (first pixel data) of the measurement data with the reference pixel data (first reference data) of the reference image data according to a predetermined algorithm in order to judge the existence of a defect. The compared result is output to the defect merging processing unit 56.

In the inspection system 63, the position alignment unit 50 reads the measurement data from the measurement data memory 46 and the reference image data from the reference data memory 44. Then, position alignment is performed between the measurement data and the reference image data in each region of the size of 512×512 pixels, for example. The comparing unit 54 compares each pixel data (second pixel data) of the measurement data with reference pixel data (second reference data) of the reference image data according to a predetermined algorithm in order to judge the existence of a defect. The compared result is output to the defect merging processing unit 56.

Figure 8:
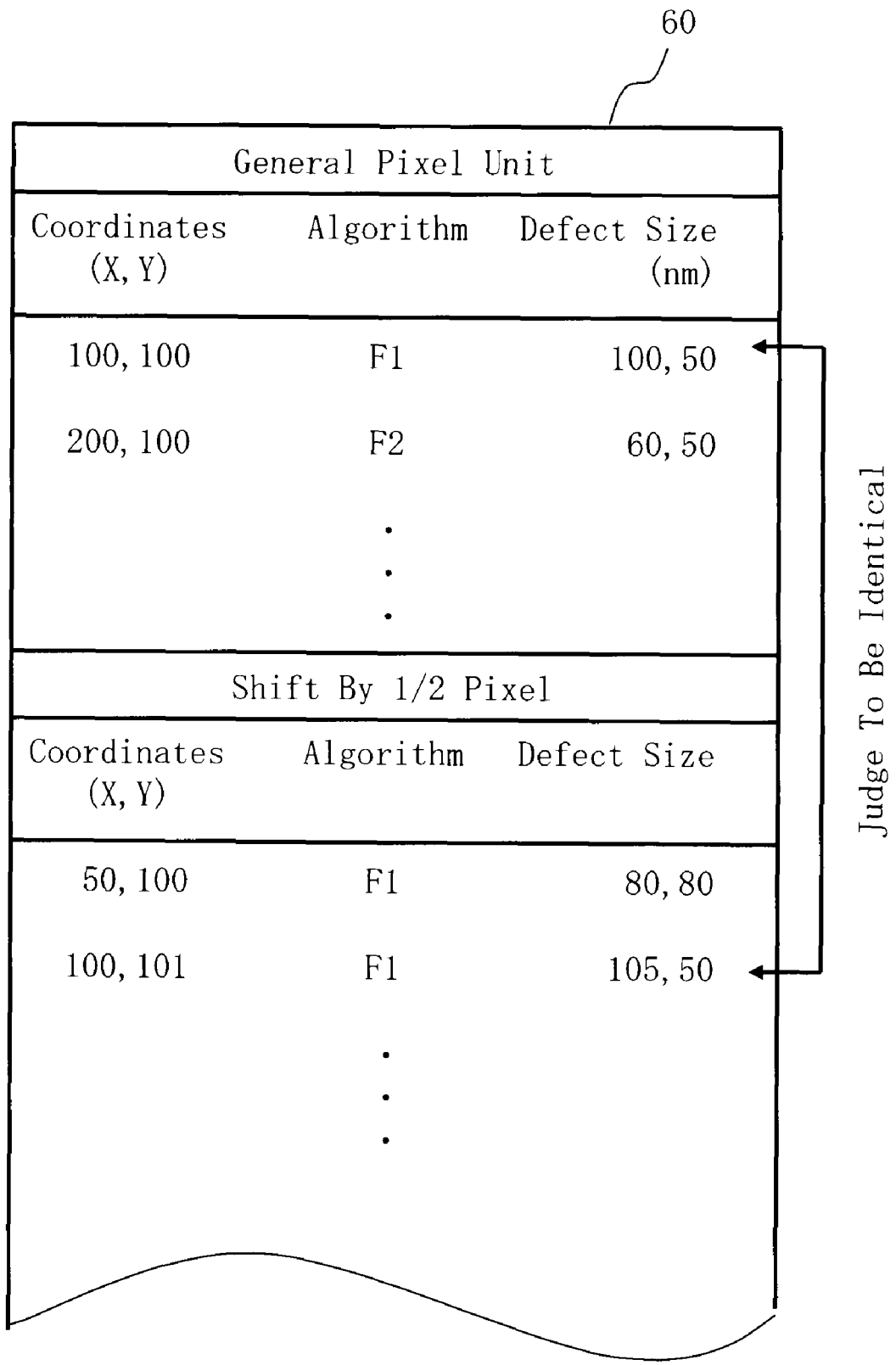
FIG. 8 shows an example of a defect list according to Embodiment 1.

FIG. 8 shows an example of a defect list according to Embodiment 1. The defect merging processing unit 56 serving as an example of a merge processing unit creates a defect list 60 based on detect information, such as the coordinates (X, Y) judged to be a defect based on a comparison result by the comparing units 52 and 54, an identification mark of an algorithm used in comparing, and a defect size. Then, detect information judged to be a defect in both the comparing units 52 and 54, and duplicatedly defined in the defect list 60 is merged. In the example of FIG. 8, with respect to the defect of coordinates (100, 100) which was judged to be a defect in the comparing unit 52 and the defect of coordinates (100, 101) which was judged to be a defect in the comparing unit 54 are judged to be the same defect because difference in coordinates and defect size is small. These judgment criteria may be set as threshold values, respectively. The defect merging processing unit 56 outputs a defect list as a merged result.

Figure 9:
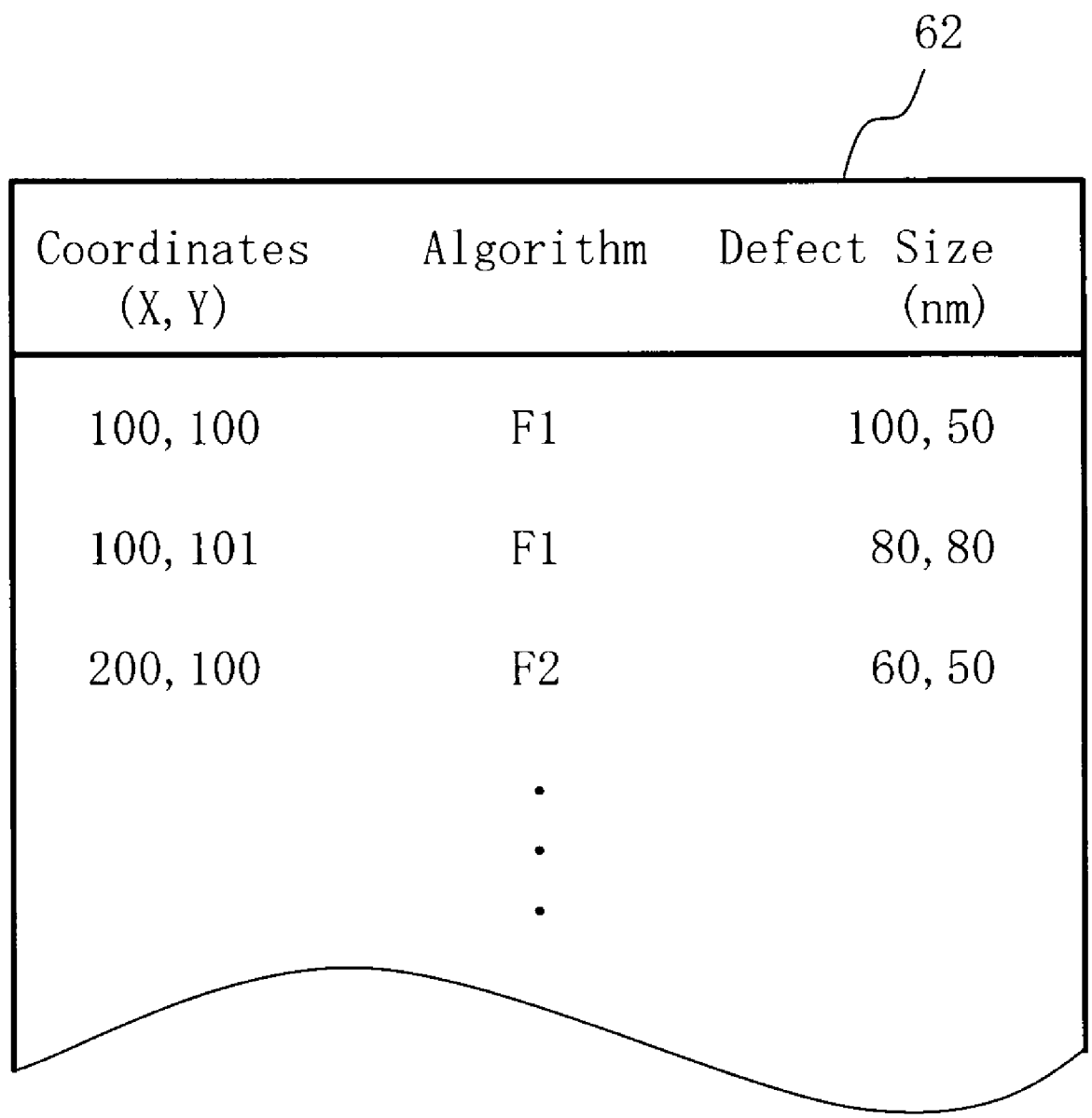
FIG. 9 shows an example of a defect list after merging according to Embodiment 1.

FIG. 9 shows an example of a defect list after merging in Embodiment 1. In a defect list 62 after merging shown in FIG. 9, the defect of the coordinates (100, 100) judged to be a defect by the comparing unit 52 and the defect of the coordinates (100, 101) judged to be a defect by the comparing unit 54 shown in FIG. 8 are merged (merging processing), and then only the defect of the coordinates (100, 100) which was judged to be a defect by the comparing unit 52 is defined. Of course, it is also acceptable to define only the defect of the coordinates (100, 101) judged to be a defect by the comparing unit 54. The defect list 62 is output to the magnetic disk drive 109, the magnetic tape drive 115, the FD 116, the CRT 117, the pattern monitor 118, or the printer 119. Alternatively, it may be output to the outside of the apparatus. Thus, by merging comparison results, the inspection result can be adjusted compared with the case of respectively outputting the results. Consequently, the user convenience can be increased, and further, the time concerning checking after the inspection can be shortened.

The structure described above makes it possible to perform inspection at the two positions of the general pixel unit position and the position shifted therefrom by a sub-pixel unit. Therefore, even when a defect straddles the boundary of a pixel region of a sensor, it is feasible to detect and judge a defect by at least one of the inspections at the two positions.

Although the duplicated defect information is merged by the defect merging processing unit 56 in Embodiment 1, it is not limited to doing so. It is also acceptable to output a comparison result compared in the comparing unit 52 and a comparison result compared in the comparing unit 54 to the magnetic disk drive 109, the magnetic tape drive 115, the FD 116, the CRT 117, the pattern monitor 118, or the printer 119 without merging the results. Alternatively, it may be output to the outside of the apparatus. What is necessary is that the user can see the defect position, based on a respective result.

Figure 10:
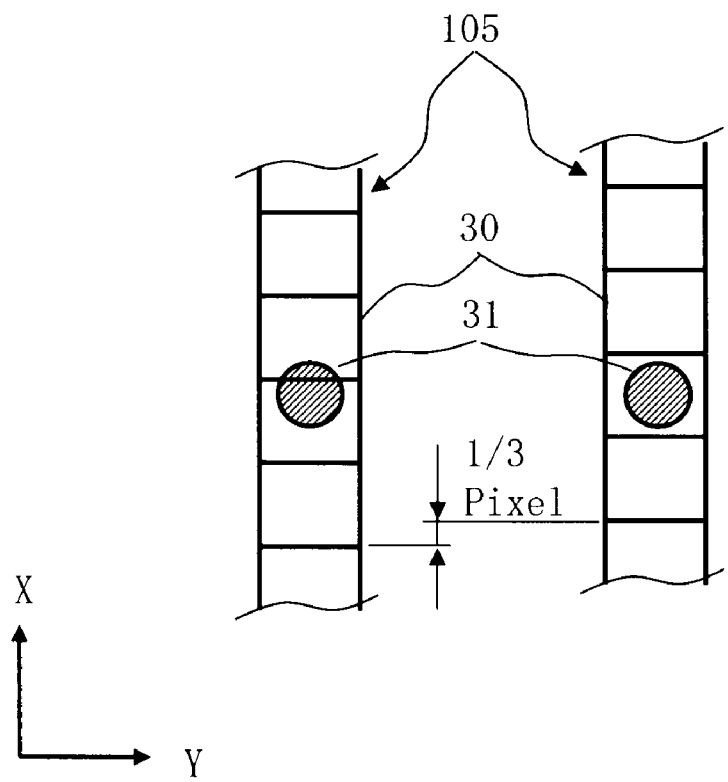
FIG. 10 is a schematic diagram showing another example of how to shift a line sensor according to Embodiment 1.

FIG. 10 is a schematic diagram showing another example of how to shift the line sensor according to Embodiment 1. FIG. 10 shows the case image capturing is performed at the positions shifted each other by ⅓ pixel (0.33 pixel) in the X direction when advancing and returning. Thus, it is preferable for each pixel data to be imaged overlappedly at the positions shifted each other by ⅓ pixel. In advancing shown in FIG. 10, for example, when the defect 31 straddles the boundary of the light receiving element 30 of the line sensor 105 by the straddling ratio of around 1:2, since the line sensor 105 captures an image at the position shifted by ⅓ pixel in the X direction when returning, the entire defect 31 can be included in one of the light receiving elements 30.

Figure 11:
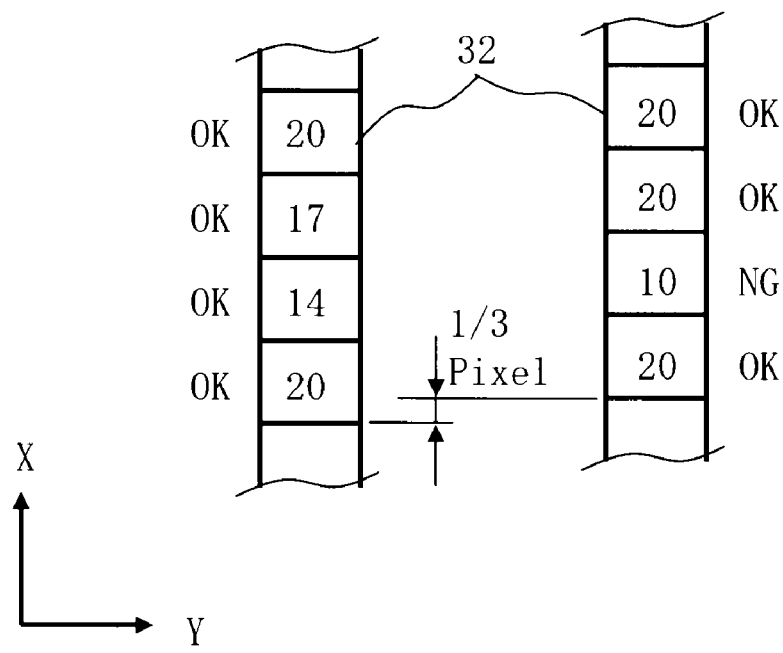
FIG. 11 shows an example of a gray level value of each pixel imaged in the state of FIG. 10.

FIG. 11 shows an example of a gray level value of each pixel imaged in the state of FIG. 10. In this case, it is supposed the pixel value (gray level value) of the transmitting part is adjusted to be 20 and that of the shading part to be 0, for example. Then, when advancing, for example, the pixel 32 with no defect 31 being a shading part has a gray level value of 20, whereas the pixel 32 having imaged ⅓ of the defect 31 has a gray level value of 17, and the pixel 32 having imaged ⅔ of the defect 31 has a gray level value of 14. Although not shown, gray level values of all the pixels in the reference data are respectively 20 because there is no defect 31. If the defect judgment threshold value for judging a defect is defined to be 7, when a difference between the gray level values of a pixel and the reference data is 7 or more, it is judged that there is a defect. In the case of the pixels 32 having imaged ⅓ and ⅔ of the defect 31, their gray level values are 17 and 14, which differ from the gray level value of the reference data by only 3 or 6 gray levels, being less than the threshold of 7. Thus, it is not judged that there is a defect, thereby making an incorrect judgment. On the other hand, when returning, the pixel 32 without the defect 31 has a gray level value of 20, whereas the pixel 32 having imaged the entire defect 31 has a gray level value of 10. Since the gray level difference is 10, it is judged that there is a defect because of being different from the gray level value of the reference data by 7 or more gray levels.

Thus, it is acceptable for the sensor to be shifted by ⅓ pixel or ¼ pixel. What is important to distribute the dead band region between sensor pixels. It is preferable to be shifted ¼ pixel or more.

Embodiment 2

While the same region is overlappedly imaged at the positions shifted each other by a sub-pixel by using one line sensor 105 according to Embodiment 1, it is not limited to such a method. In Embodiment 2, a structure is described in which the same region is overlappedly imaged at the positions shifted each other by a sub-pixel by using a plurality of sensors. Then, it should be understood that the plurality of line sensors move relatively to the movement of the XYθ table 102.

Figure 12:
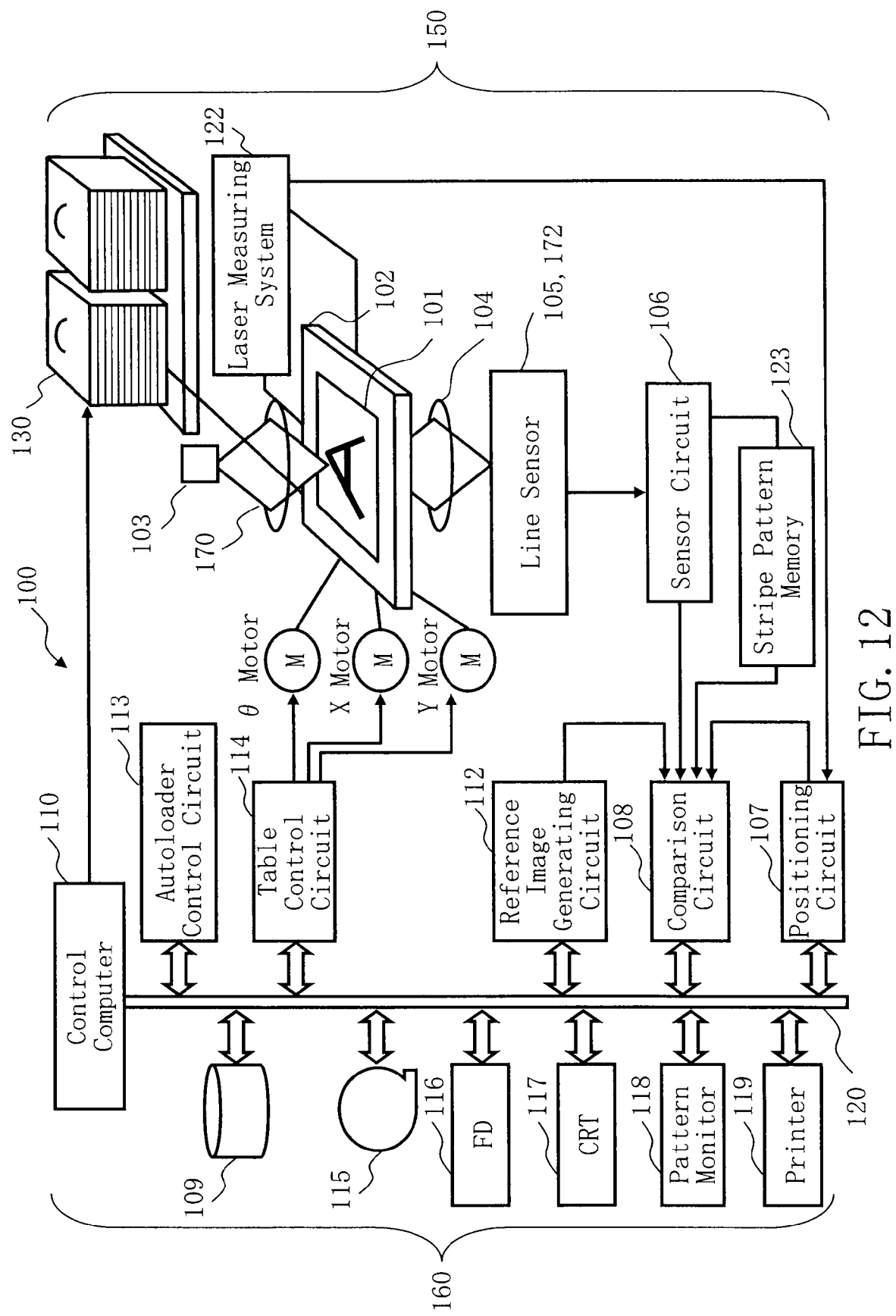
FIG. 12 is a schematic diagram showing a structure of a pattern inspection apparatus according to Embodiment 2.

FIG. 12 is a schematic diagram showing a structure of a pattern inspection apparatus according to Embodiment 2. FIG. 12 is the same as FIG. 1 other than a line sensor 172 being added.

Figure 13:
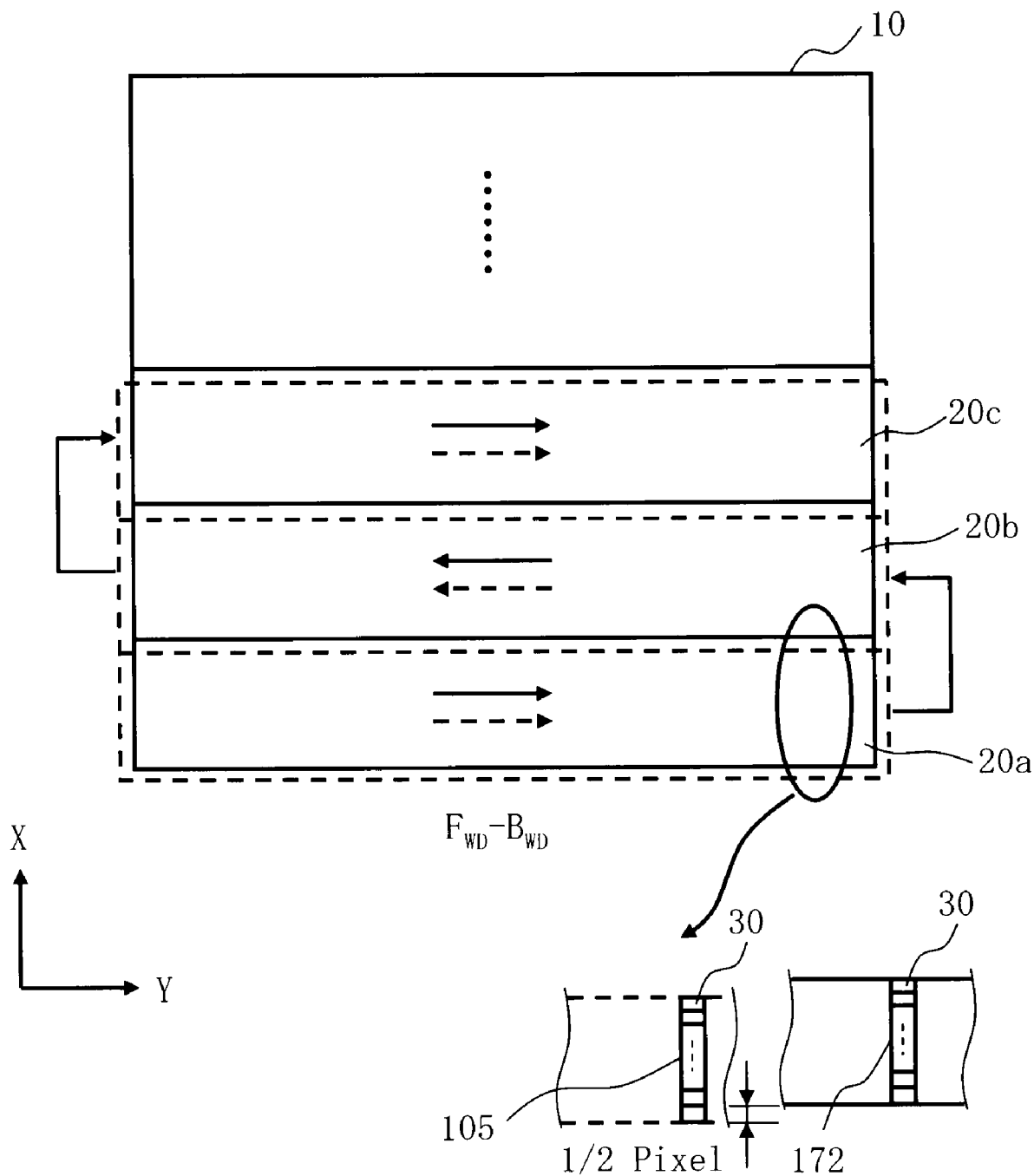
FIG. 13 is a schematic diagram for explaining a procedure for acquiring an optical image according to Embodiment 2.

FIG. 13 is a schematic diagram for explaining a procedure for acquiring an optical image according to Embodiment 2. The inspection region 10 is virtually divided into a plurality of strip-like inspection stripes 20 each having a scanning width W, for example, in the X direction as indicated by the arrow as shown in FIG. 13. The operation of the XYθ table 102 is controlled so that the line sensors 105 and 172 may scan each divided inspection stripe 20 simultaneously or substantially simultaneously. When the XYθ table 102 moves, optical images are acquired by the line sensors 105 and 172, which continuously move relatively in the Y direction (first direction) as indicated by the arrow shown in FIG. 13. The line sensor 105 continuously captures optical images each having a scanning width W as shown in FIG. 13. The line sensor 172, which is arranged at the position shifted from the line sensor 105 by a sub-pixel such as ½ pixel in the X direction, continuously captures optical images each having a scanning width W as shown in FIG. 13. According to Embodiment 2, first the two line sensors 105 and 172, shifted each other by ½ pixel in the X direction, capture an optical image in one inspection stripe 20 simultaneously or substantially simultaneously, and then, they shift in the X direction by the scanning width W to continuously capture an optical image each having a scanning width W while moving in a reverse direction. That is, the image capturing is repeated in the forward (FWD) and backward (BWD) direction, meaning going in a reverse direction when advancing and returning. Specifically, first, the line sensor 105 at the position shifted from the first inspection stripe 20a by ½ pixel in the –X direction and the line sensor 172 at the regular position of the first inspection stripe 20a respectively capture an image in the inspection stripe 20a in the Y direction as an inspection direction. Then, after moving in the X direction by the scanning width W, the line sensor 105 at the position shifted from the inspection stripe 20b by ½ pixel in the –X direction and the line sensor 172 at the regular position of the inspection stripe 20b respectively capture an image in the inspection stripe 20b in the –Y direction as an inspection direction. Then, after moving in the X direction by the scanning width W, the line sensor 105 at the position shifted from the inspection stripe 20c by ½ pixel in the –X direction and the line sensor 172 at the regular position of the inspection stripe 20c respectively capture an image in the inspection stripe 20c in the Y direction as an inspection direction. Thus, images are acquired so that images of the same region are overlappedly captured simultaneously or substantially simultaneously at the positions shifted each other by a sub-pixel.

Figure 14:
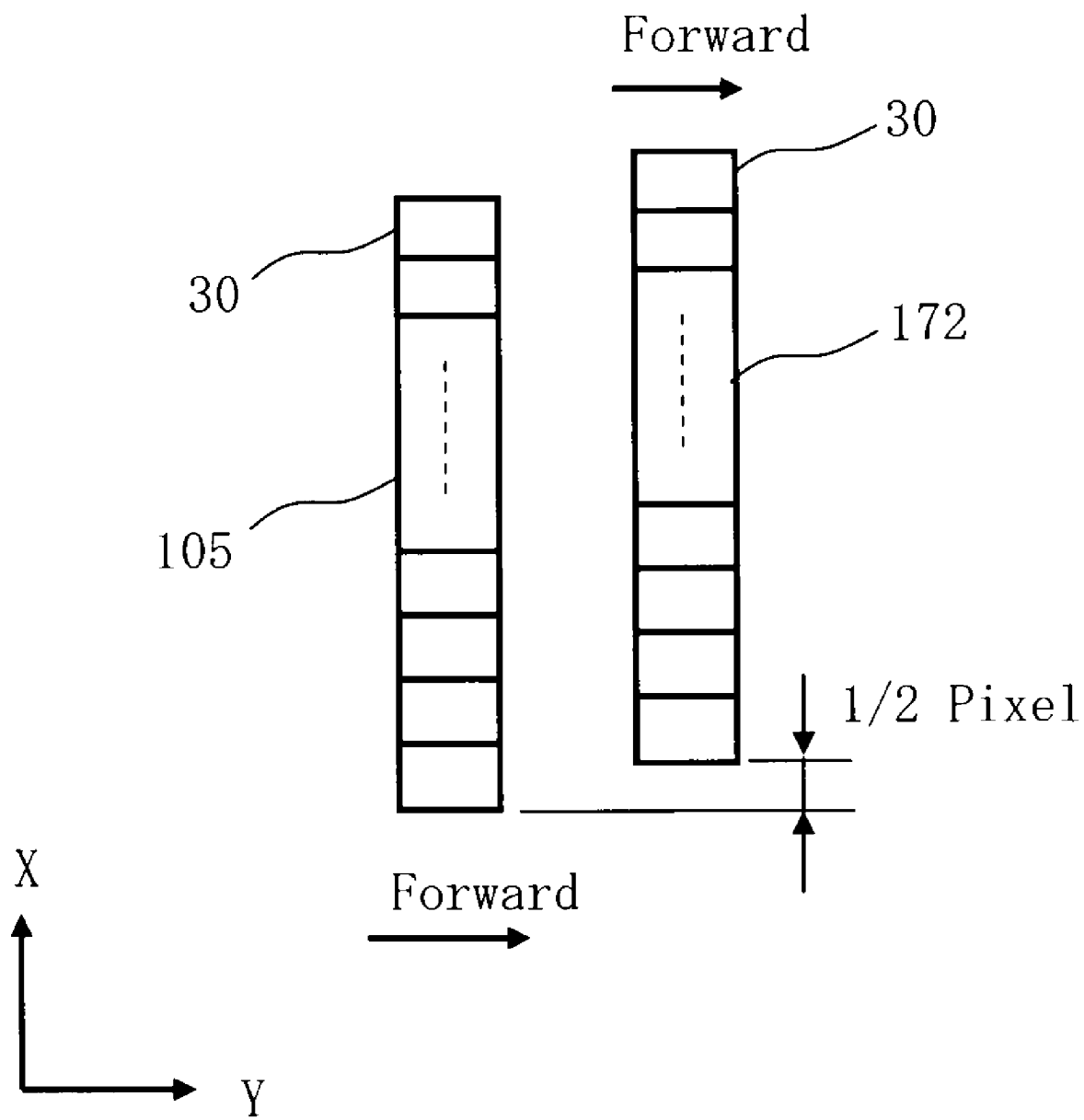
FIG. 14 is a schematic diagram showing an example of how to shift a line sensor according to Embodiment 2.

FIG. 14 is a schematic diagram showing an example of how to shift the line sensor according to Embodiment 2. In FIG. 14, when the line sensors 105 and 172 in each of which a plurality of light receiving elements 30 for 2048 pixels are arrayed in the X direction are used, image capturing is performed overlappedly at the positions shifted each other by ½ pixel (0.5 pixel) in the X direction when advancing and returning. As stated above, it is not limited for each pixel data to be shifted by ½ pixel. As will be described, it may be shifted by ⅓ or ¼ pixel.

Figure 15:
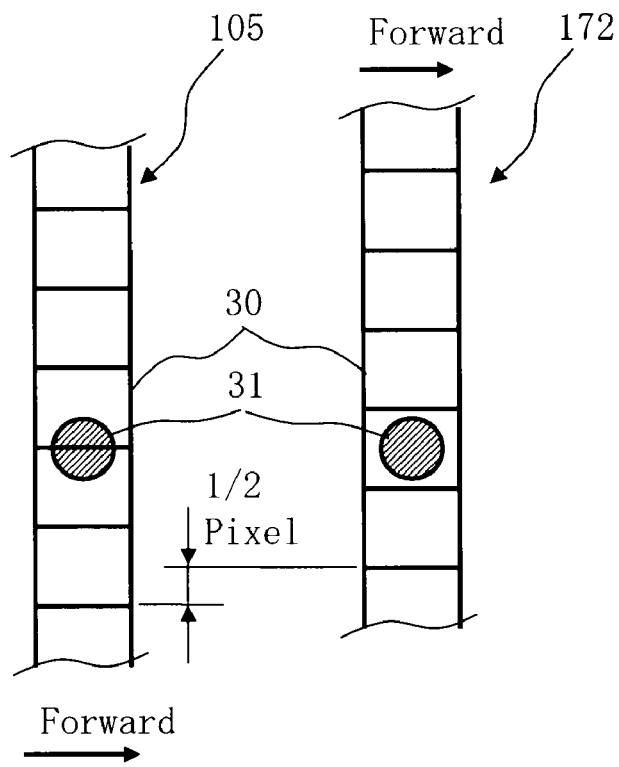
FIG. 15 shows an example of the case of a defect position straddling the boundary of a pixel region of a sensor according to Embodiment 2.

FIG. 15 shows an example of the case of a defect position straddling the boundary of a pixel region of a sensor according to Embodiment 2. In FIG. 15, for example, even when the center of the defect 31 straddles the boundary of the light receiving element 30 of the line sensor 105 when advancing, since the line sensor 172 captures an image at the position shifted by ½ pixel in the X direction, the entire defect 31 can be included in one of the light receiving elements 30.

Figure 16:
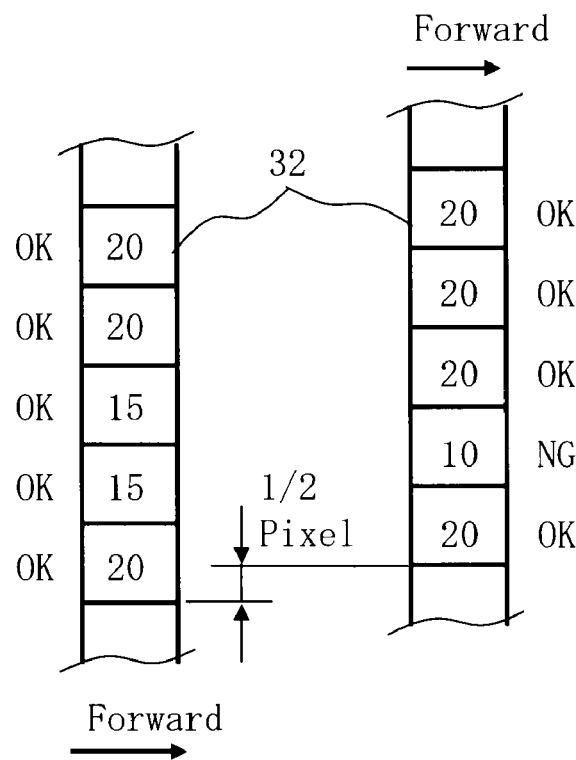
FIG. 16 shows an example of a gray level value of each pixel imaged in the state of FIG. 15.

FIG. 16 shows an example of a gray level value of each pixel imaged in the state of FIG. 15. In this case, it is supposed the pixel value (gray level value) of the transmitting part is adjusted to be 20 and that of the shading part to be 0, for example. Then, for example, when image capturing is performed by the line sensor 105, the pixel 32 with no defect 31 being a shading part has a gray level value of 20, whereas the pixel 32 having imaged half of the defect 31 has a gray level value of 15. Although not shown, gray level values of all the pixels in the reference data are respectively 20 because there is no defect 31. If the defect judgment threshold value for judging a defect is defined to be 7, when a difference between the gray level values of a pixel and the reference data is 7 or more, it is judged that there is a defect. In the case of the pixel 32 having imaged half of the defect 31, it has a gray level value of 15, which differs from the gray level value of the reference data by only 5 gray levels. Thus, it is not judged that there is a defect, thereby making an incorrect judgment. On the other hand, when image capturing is performed by the line sensor 172, the pixels 32 without the defect 31 has a gray level value of 20, whereas the pixel 32 having imaged the entire defect 31 has a gray level value of 10. Since the gray level difference is 10, it is judged that there is a defect because of being different from the gray level value of the reference data by 7 or more gray levels. Other structure and operations are the same as those of Embodiment 1.

As mentioned above, even by overlappingly imaging the same region at the positions shifted each other by a sub-pixel by using a plurality of line sensors, it is possible to obtain the same effect as Embodiment 1, namely to avoid or reduce overlooking defects. Furthermore, since a plurality of sensors are used in Embodiment 2, it is possible to overlappingly perform imaging simultaneously or substantially simultaneously, thereby reducing the inspection time.

While the structure applying the two line sensors 105 and 172 is described in Embodiment 2, it should be understood that three or more line sensors may be used.

Embodiment 3

While the structure in which positions are shifted each other by a sub-pixel when advancing and returning is explained in Embodiment 1, there will be described a structure in which positions are shifted by a pixel unit and then, further shifted by a sub-pixel in Embodiment 3. The structure of the apparatus is the same as that of Embodiment 1. Then, it should be understood that the line sensor moves relatively to the movement of the XYθ table 102.

Figure 17:
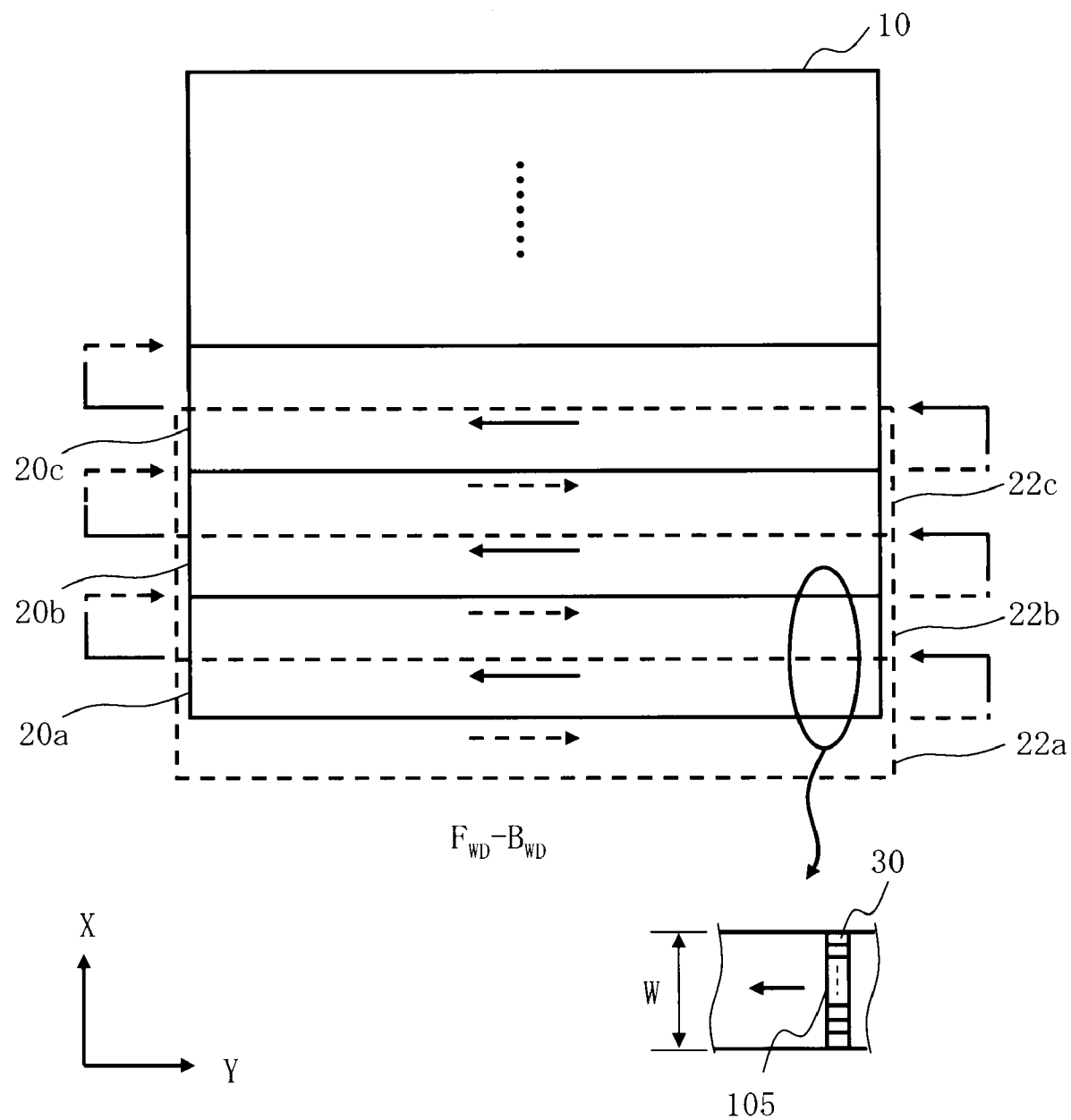
FIG. 17 is a schematic diagram for explaining a procedure for acquiring an optical image according to Embodiment 3.

FIG. 17 is a schematic diagram for explaining a procedure for acquiring an optical image according to Embodiment 3. The inspection region 10 is virtually divided into a plurality of strip-like inspection stripes 20 each having of a scanning width W, for example, in the X direction as indicated by the arrow as shown in FIG. 17. In addition to the inspection stripes 20, the inspection region 10 is virtually divided into a plurality of strip-like inspection stripes 22 each having of a scanning width W. By being divided, each inspection stripe 22 is shifted in the X direction from each inspection stripe 20 by an amount of subtracting a sub-pixel from ½ of the scanning width W. The operation of the XYθ table 102 is controlled so that each divided inspection stripe 20 (or inspection stripe 22) may be continuously scanned. When the XYθ table 102 moves, an optical image is acquired by the line sensor 105 which continuously moves relatively in the Y direction (first direction) as indicated by the arrow shown in FIG. 17. The line sensor 105 continuously captures optical images each having a scanning width W as shown in FIG. 17. According to Embodiment 3, the line sensor 105 captures an optical image in one inspection stripe 20 (or inspection stripe 22) first, and then, shifts from ½ of the scanning width W by a sub-pixel in X or –X direction to continuously capture optical images each having a scanning width W while moving in a reverse direction. That is, the image capturing is repeated in the forward (FWD) and backward (BWD) direction, meaning going in a reverse direction when advancing and returning. Specifically, first, the line sensor 105 captures an image in the first inspection stripe 22a, which is shifted by ½ of the scanning width W of the first inspection stripe 20a and a sub-pixel, in the Y direction as an inspection direction. Then, the line sensor moves in the X direction by the amount of subtracting a sub-pixel from ½ of the scanning width W, and captures an image in the inspection stripe 20a in the –Y direction as an inspection direction. Next, after moving in the X direction by the amount of ½ of the scanning width W and a sub-pixel, the line sensor 105 captures an image in the inspection stripe 22b in the Y direction as an inspection direction. Then, after moving in the X direction by the amount of subtracting a sub-pixel from ½ of the scanning width W, the line sensor 105 captures an image in the inspection stripe 20b in the −Y direction as an inspection direction. Further, after moving in the X direction by the amount of ½ of the scanning width W and a sub-pixel, the line sensor 105 captures an image in the inspection stripe 22c in the Y direction as an inspection direction. Next, after moving in the X direction by the amount of subtracting a sub-pixel from ½ of the scanning width W, the line sensor 105 captures an image in the inspection stripe 20c in the −Y direction as an inspection direction. Thus, the line sensor 105 acquire images continuously by shifting by a sub-pixel from ½ of the scanning width W. Thereby, the inspection region 10 is overlappedly imaged by the line sensor 105 which shifts from ½ of the scanning width W by a sub-pixel when advancing and returning.

In Embodiment 3, there is described a case where the image of pixel data (first pixel data) captured when advancing and the image of pixel data (second pixel data) captured when returning are captured by using one line sensor 105. The line sensor 105 includes a plurality of light receiving elements 30 arrayed in the X direction (second direction) orthogonal to the Y direction (first direction) to which the one line sensor 105 moves relatively to the XYθ table 102 (stage). After the image of the pixel data (first pixel data) has been captured while advancing, the line sensor 105 is shifted in the X direction by a pixel unit and a sub-pixel unit, and then the image of the pixel data (second pixel data) is captured while returning.

Figure 18:
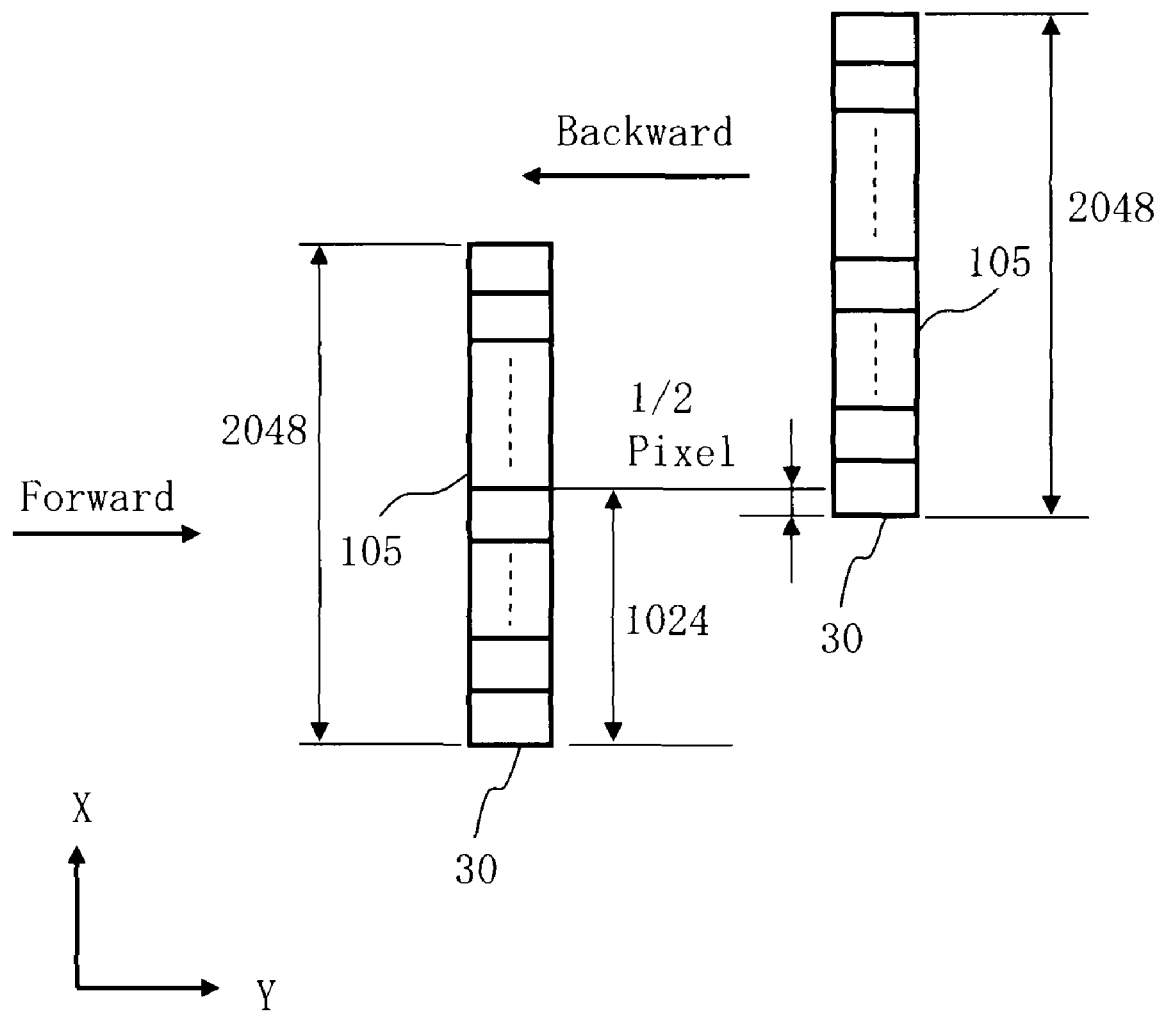
FIG. 18 is a schematic diagram showing an example of how to shift the line sensor according to Embodiment 3.

FIG. 18 is a schematic diagram showing an example of how to shift the line sensor according to Embodiment 3. In FIG. 18, when the line sensor 105 in which a plurality of light receiving elements 30 for 2048 pixels are arrayed in the X direction is used, image capturing is performed at the positions shifted each other in the X direction by the amount of subtracting ½ pixel from 1024 pixels when advancing and returning. Thus, it is preferable for the images of each pixel data to be captured overlappedly at or around the positions shifted each other by ½ of the number of the plurality of light receiving elements 30. However, it is not limited to ½. It is acceptable to shift in the X direction by the number of elements fewer than the number of the plurality of light receiving elements 30 based on a pixel unit, and then, to shift from this position by a sub-pixel. Owing to this, each pixel of the image of the inspection region 10 is captured overlappedly at the positions shifted each other by a sub-pixel.

Since the shifting is performed not only by a sub-pixel but also by a pixel unit as described above, the pixel data (first pixel data) is acquired, before shifting, by one of the light receiving elements 30 in the line sensor 105, and the pixel data (second pixel data) is acquired, after shifting, by one of the light receiving elements 30 arranged at a position which is different from the position where the first pixel data has been acquired. Then, the each pixel data is compared with corresponding reference pixel data. Thus, since the pixel data is image captured by the light receiving elements 30 arranged at different positions to be inspected respectively, property variation among elements can be averaged. Therefore, in addition to the effect of avoiding or reducing overlooking a defect which straddles the pixel regions, which has been explained in Embodiment 1, it is further possible to obtain the effect of reducing incorrect judgment due to measurement data errors caused by property variation. Accordingly, inspection precision can be improved further than Embodiment 1.

Embodiment 4

While the structure in which positions are shifted by a sub-pixel among a plurality of line sensors is explained in Embodiment 2, there will be described a structure in which positions are shifted by a pixel unit, and then, further shifted by a sub-pixel in Embodiment 4. The structure of the apparatus is the same as that of Embodiment 2. Then, it should be understood that the plurality of line sensors move relatively to the movement of the XYθ table 102.

Figure 19:
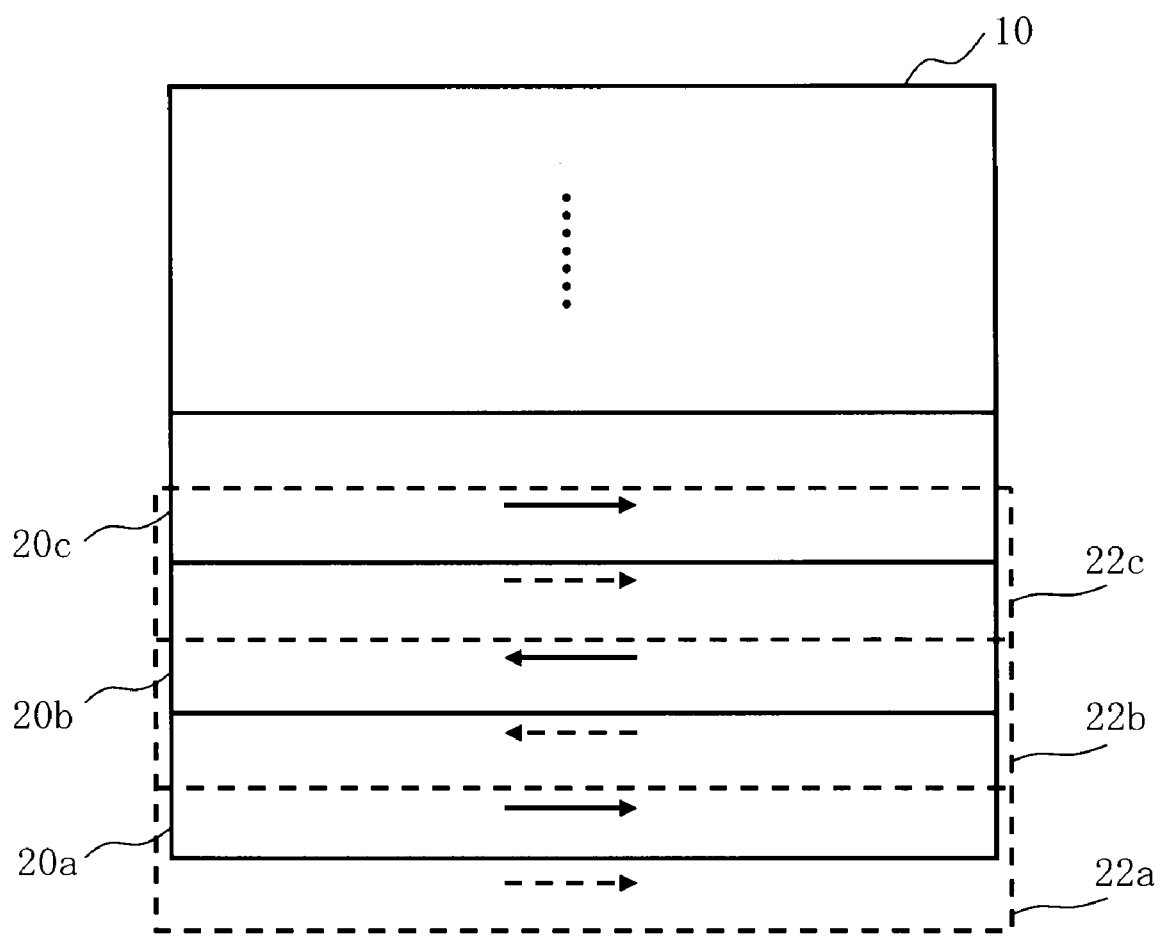
FIG. 19 is a schematic diagram for explaining a procedure for acquiring an optical image according to Embodiment 4.
Figure 19:
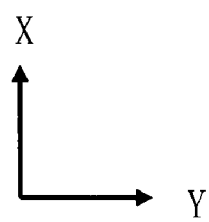

FIG. 19 is a schematic diagram for explaining a procedure for acquiring an optical image according to Embodiment 4. The inspection region 10 is virtually divided into a plurality of strip-like inspection stripes 20 each having of a scanning width W, for example, in the X direction as indicated by the arrow as shown in FIG. 19. In addition to the inspection stripes 20, the inspection region 10 is virtually divided into a plurality of strip-like inspection stripes 22 each having of a scanning width W. By being divided, each inspection stripe 22 is shifted from each inspection stripe 20 in the X direction by the amount of subtracting a sub-pixel from ½ of the scanning width W. The two line sensors 105 and 172 are arranged to be shifted in the X direction by the amount of subtracting a sub-pixel from ½ of the scanning width W. The operation of the XYθ table 102 is controlled so that each divided inspection stripe 20 and each divided inspection stripe 22 may be continuously scanned. When the XYθ table 102 moves, optical images are acquired by the line sensors 105 and 172, which continuously move relatively in the Y direction (first direction) as indicated by the arrow shown in FIG. 19. The line sensors 105 and 172 respectively continuously capture optical images each having a scanning width W as shown in FIG. 19. According to Embodiment 4, after capturing optical images in one inspection stripe 20 and one inspection stripe 22, the line sensors 105 and 172 continuously capture optical images each having a scanning width W at the position shifted by ½ of the scanning width W in the X direction while moving in a reverse direction. That is, the image capturing is repeated in the forward (FWD) and backward (BWD) direction, meaning going in a reverse direction when advancing and returning. Specifically, the line sensor 105 captures an image in the inspection stripe 22a, which includes ½ of the scanning width W of the first inspection stripe 20a and a sub-pixel, in the Y direction as an inspection direction and, simultaneously, the line sensor 172 captures an image in the inspection stripe 20a also in the Y direction. Then, they move in the X direction by the amount of ½ of the scanning width W. Secondly, the line sensor 105 captures an image in the inspection stripe 22b in the −Y direction as an inspection direction, and, simultaneously, the line sensor 172 captures an image in the inspection stripe 20b in the −Y direction as an inspection direction. Next, after moving in the X direction by the amount of ½ of the scanning width W, the line sensor 105 captures an image in the inspection stripe 22c in the Y direction as an inspection direction, and, simultaneously, the line sensor 172 captures an image in the inspection stripe 20c in the Y direction as an inspection direction. Thus, the inspection region 10 is image captured overlappedly by the two line sensors 105 and 172 at the positions shifted each other by a sub-pixel.

Figure 20:
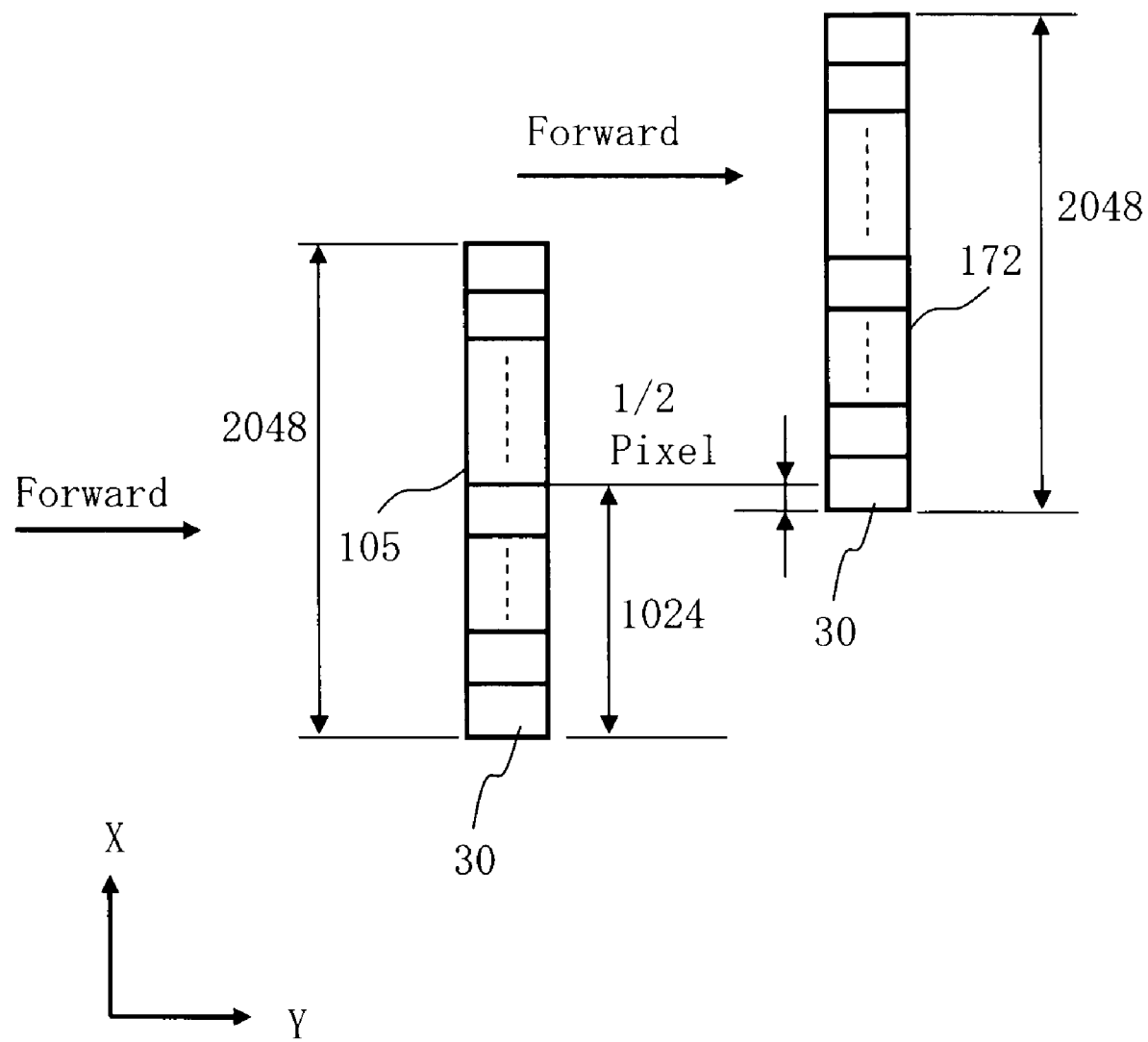
FIG. 20 is a schematic diagram showing an example of how to shift a line sensor according to Embodiment 4.

FIG. 20 is a schematic diagram showing an example of how to shift the line sensor according to Embodiment 4. In FIG. 20, when the line sensor 105 in which a plurality of light receiving elements 30 for 2048 pixels are arrayed in the X direction is used, the line sensor 172 is arranged at the position shifted by the amount of subtracting ½ pixel from 1024 pixels in the X direction. As has been stated, the shifting sub-pixel amount is not limited to ½.

Since the shifting is performed not only by a sub-pixel but also by a pixel unit as described above, the pixel data (first pixel data) is acquired, before shifting, by one of the light receiving elements 30 in the line sensor, and the pixel data (second pixel data) is acquired, after shifting, by one of the light receiving elements 30 in the line sensor which is different from the line sensor used for acquiring the first pixel data. Then, the each pixel data is compared with corresponding reference pixel data. Thus, since the pixel data is image captured by the light receiving elements 30 arranged at different line sensors to be inspected respectively, property variation among elements can be averaged. Therefore, in addition to the effect of avoiding or reducing overlooking a defect which straddles the pixel regions, which has been explained in Embodiment 2, it is further possible to obtain the effect of reducing incorrect judgment due to measurement data errors caused by property variation. Accordingly, inspection precision can be improved further than Embodiment 2.

Figure 21:
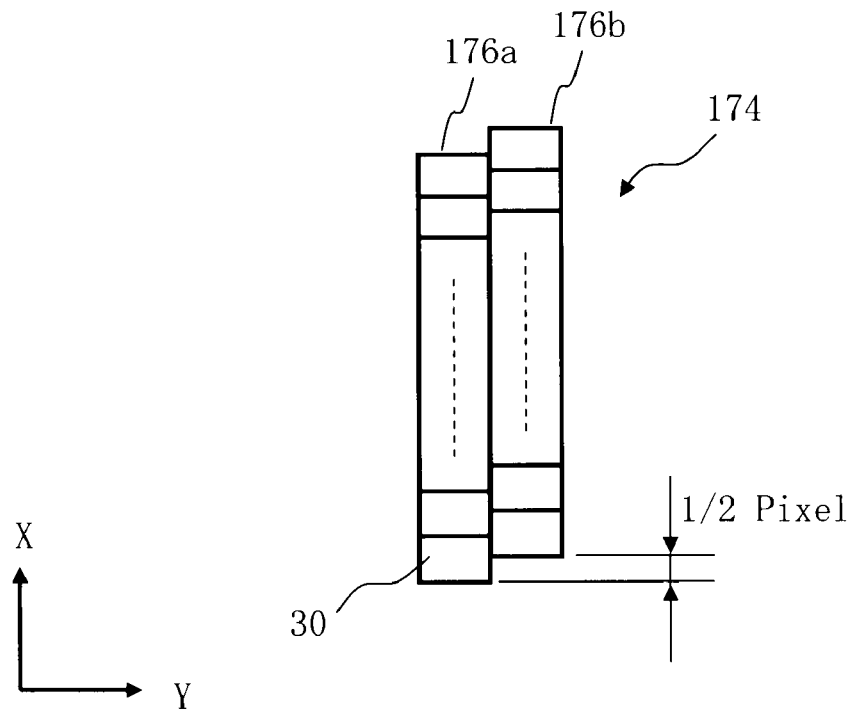
FIG. 21 shows an example of a two-dimensional sensor.

The line sensor is used in each Embodiment mentioned above, and it is also acceptable to use a two-dimensional sensor (ex. TDI sensor) in which light receiving elements are arrayed two-dimensionally. FIG. 21 shows an example of a two-dimensional sensor. In FIG. 21, a two-dimensional sensor 174 includes a line unit 176a in the first row, in which a plurality of light receiving elements 30 are arranged in the X direction, and a line unit 176b in the second row, in which a plurality of light receiving elements 30 are arranged shifted from the first row by a sub-pixel, such as ½ pixel, in the X direction. The same effect can be obtained by a structure where the two-dimensional sensor 174 is used instead of the line sensors 105 and 172 of Embodiment 2.

Figure 22:
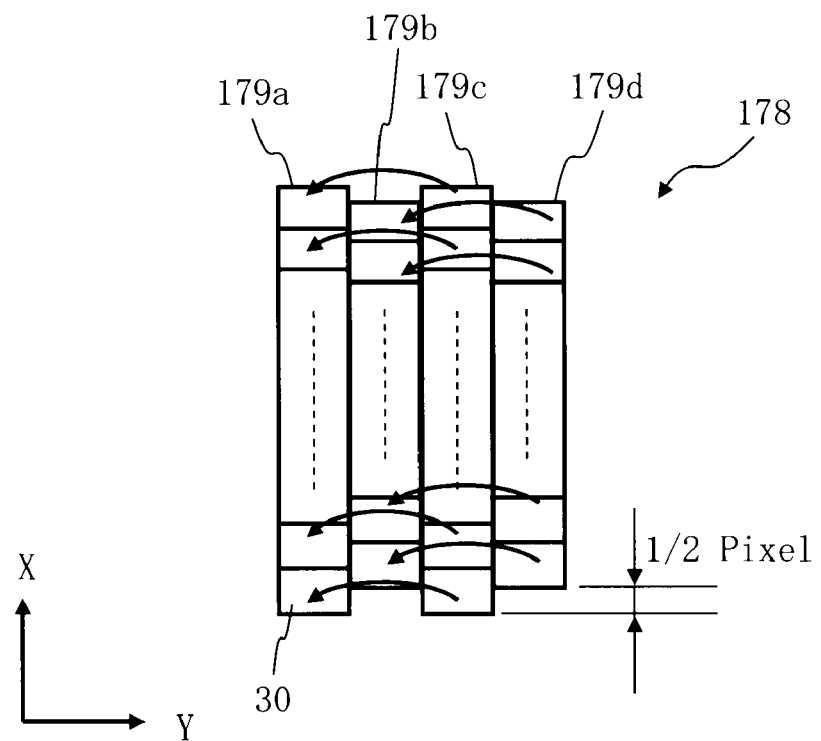
FIG. 22 shows another example of a two-dimensional sensor.

FIG. 22 shows another example of a two-dimensional sensor. In FIG. 22, a two-dimensional sensor 178 includes a line unit 179a in the first row, in which a plurality of light receiving elements 30 are arranged in the X direction, a line unit 179b in the second row, in which a plurality of light receiving elements 30 are arranged shifted from the first row by a sub pixel, such as ½ pixel, in the X direction, a line unit 179c in the third row, in which a plurality of light receiving elements 30 are arranged at the position in accordance with that of the first row, and a line unit 179d in the fourth row, in which a plurality of light receiving elements 30 are arranged at the position in accordance with that of the second row. As a matter of course, it is not limited to four rows, and more than four rows may be used. It is preferable to respectively acquire optical images while adjusting relative speed between the stage and the two-dimensional sensor so that each light receiving element 30 of the line unit 179a in the first row and each light receiving element 30 of the line unit 179c in the third row may continuously capture images, and so that each light receiving element 30 of the line unit 179b in the second row and each light receiving element 30 of the line unit 179d in the fourth row may continuously capture images. By using the two-dimensional sensor 178 instead of the line sensors 105 and 172 of Embodiment 2, the same effect as Embodiment 2 can be acquired while obtaining the same effect as that of the TDI sensor.

According to the Embodiments mentioned above, since inspections are respectively performed by overlappingly capturing optical images of the target workpiece to be inspected, at the positions shifted each other by a sub-pixel, it is possible to detect and judge a defect by at least one of both the inspections. Accordingly, overlooking a defect can be avoided or reduced, thereby improving the inspection precision.

What is represented by the words "unit" or "circuit" in the description above can be configured by computer programs. They may be implemented by software programs executed by the computer system. Alternatively, they may be executed by a combination of software and hardware, or a combination of software, hardware and/or firmware. When constituted by a program, the program is stored in a recording medium, such as the magnetic disk drive 109, the magnetic tape drive 115, the FD 116, or the ROM (Read Only Memory). For example, each circuit, etc. in the autoloader control circuit 113, the table control circuit 114, the reference image generating circuit 112, the comparison circuit 108, and the positioning circuit 107 that constitute an operation control unit may be configured by electric circuits. Alternatively, they may be executed as software to be processed by the control computer 110, or executed by a combination of electric circuits and software.

While the embodiments have been described with reference to specific examples, the present invention is not restricted to these specific ones. For example, it is acceptable for the light receiving element described above to be structured to take whichever of a transfer image or a reflective image of the inspection target workpiece. Moreover, the present invention is also effective to the structure of including a plurality of light receiving elements for simultaneously or substantially simultaneously taking a transfer image and a reflective image.

While the case of "die to database inspection" is described in the above examples, it is also preferable to apply the Embodiments to the "die to die inspection." In that case, what is necessary in the two chips to be compared with the measurement data is to regard measurement data of one chip as measurement data to be inspected and measurement data of the other chip as reference data.

While description of the apparatus structure, control method, etc. not directly required for explaining the present invention is omitted, it is possible to suitably select and use some or all of them when needed. For example, although the structure of the control unit for controlling the inspection apparatus 100 is not described, it should be understood that a necessary control unit structure can be selected and used appropriately.

In addition, any other pattern inspection apparatus and pattern inspection method that include elements of the present invention and that can be appropriately modified by those skilled in the art are included within the scope of the present invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A pattern inspection apparatus comprising:
a stage configured to mount thereon a target workpiece to be inspected where patterns are formed;
at least one sensor configured to move relatively to the stage and capture optical images of the target workpiece to be inspected;
a first comparing unit configured to compare first pixel data of an optical image captured by one of the at least one sensor with first reference data at a position corresponding to a position of the first pixel data; and a second comparing unit configured to compare second pixel data of an optical image captured by one of the at least one sensor at a position shifted by a sub-pixel unit from the position where the optical image of the first pixel data is captured, with second reference data at a position corresponding to the position of the second pixel data.

2. The apparatus according to claim 1, wherein when the optical image of the first pixel data and the optical image of the second pixel data are captured by one sensor, after the optical image of the first pixel data is captured, the one sensor is shifted in a second direction by a sub-pixel unit, and then, the optical image of the second pixel data is captured, and the one sensor includes a plurality of light receiving elements arrayed in the second direction orthogonal to a first direction to which the one sensor moves relatively to the stage.

3. The apparatus according to claim 1, wherein when the optical image of the first pixel data and the optical image of the second pixel data are captured by a plurality of sensors, the optical image of the second pixel data is captured by one of the plurality of sensors which is different from one of the plurality of sensors having captured the optical image of the first pixel data.

4. The apparatus according to claim 1, wherein the at least one sensor includes a plurality of light receiving elements arrayed in a second direction orthogonal to a first direction to which the at least one sensor moves relatively to the stage, and the first pixel data is acquired by one of the plurality of light receiving elements and the second pixel data is acquired by one of the plurality of light receiving elements arranged at a position which is different from a position where the first pixel data has been acquired.

5. The apparatus according to claim 4, wherein when the optical image of the first pixel data and the optical image of the second pixel data are captured by one sensor, after the optical image of the first pixel data is captured, the one sensor is shifted in the second direction by a pixel unit and a sub-pixel unit, and then, the optical image of the second pixel data is captured.

6. The apparatus according to claim 1, further comprising: a merge processing unit configured to merge a comparison result by the first comparing unit and a comparison result by the second comparing unit.

7. The apparatus according to claim 6, wherein when the optical image of the first pixel data and the optical image of the second pixel data are captured by one sensor, after the optical image of the first pixel data is captured, the one sensor is shifted in a second direction by a sub-pixel unit, and then, the optical image of the second pixel data is captured, and the one sensor includes a plurality of light receiving elements arrayed in the second direction orthogonal to a first direction to which the one sensor moves relatively to the stage.

8. The apparatus according to claim 6, wherein when the optical image of the first pixel data and the optical image of the second pixel data are captured by a plurality of sensors, the optical image of the second pixel data is captured by one of the plurality of sensors which is different from one of the plurality of sensors having captured the optical image of the first pixel data.

9. The apparatus according to claim 6, wherein the at least one sensor includes a plurality of light receiving elements arrayed in a second direction orthogonal to a first direction to which the at least one sensor moves relatively to the stage, and the first pixel data is acquired by one of the plurality of light receiving elements and the second pixel data is acquired by one of the plurality of light receiving elements arranged at a position which is different from a position where the first pixel data has been acquired.

10. The apparatus according to claim 9, wherein when the optical image of the first pixel data and the optical image of the second pixel data are captured by one sensor, after the optical image of the first pixel data is captured, the one sensor is shifted in the second direction by a pixel unit and a sub-pixel unit, and then, the optical image of the second pixel data is captured.

11. A pattern inspection method comprising:
capturing overlappingly optical images of a target workpiece to be inspected at positions shifted each other by a sub-pixel unit;
comparing first pixel data of an optical image which has been captured with first reference data at a position corresponding to a position of the first pixel data;
comparing second pixel data of an optical image captured at a position shifted by a sub-pixel unit from the position where the optical image of the first pixel data is captured, with second reference data at a position corresponding to the position of the second pixel data; and
outputting comparison results.

12. A pattern inspection method comprising:
capturing overlappingly optical images of a target workpiece to be inspected at positions shifted each other by a sub-pixel unit;
comparing first pixel data of an optical image which has been captured with first reference data at a position corresponding to a position of the first pixel data;
comparing second pixel data of an optical image captured at a position shifted by a sub-pixel unit from the position where the optical image of the first pixel data is captured, with second reference data at a position corresponding to the position of the second pixel data; and
merging comparison results and outputting a merged result.

* * * * *